(12) United States Patent
Imaoka

(10) Patent No.: US 8,873,157 B2
(45) Date of Patent: Oct. 28, 2014

(54) INNER-FOCUS ZOOM LENS SYSTEM

(71) Applicant: Konica Minolta Advanced Layers, Inc., Tokyo (JP)

(72) Inventor: Masayuki Imaoka, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 215 days.

(21) Appl. No.: 13/624,550

(22) Filed: Sep. 21, 2012

(65) Prior Publication Data

US 2013/0070114 A1 Mar. 21, 2013

(30) Foreign Application Priority Data

Sep. 21, 2011 (JP) ................................ 2011-205639

(51) Int. Cl.
  *G02B 15/14* (2006.01)
(52) U.S. Cl.
  USPC ........... 359/680; 359/681; 359/682; 359/684; 359/686; 359/687; 359/688; 359/689; 359/690; 359/713; 359/714; 359/715; 359/716; 359/740
(58) Field of Classification Search
  USPC ......... 359/680–682, 684, 686–690, 713–716, 359/740
  See application file for complete search history.

(56) References Cited

U.S. PATENT DOCUMENTS

| 5,966,246 | A   | * | 10/1999 | Yoshikawa | 359/686 |
|-----------|-----|---|---------|-----------|---------|
| 6,122,111 | A   |   | 9/2000  | Neil et al. |       |
| 6,865,027 | B2  | * | 3/2005  | Shirasuna | 359/690 |
| 7,403,339 | B2  | * | 7/2008  | Inoko     | 359/680 |
| 7,755,843 | B2  | * | 7/2010  | Yamasaki  | 359/680 |
| 7,817,345 | B2  | * | 10/2010 | Inoko     | 359/682 |
| 8,077,397 | B2  | * | 12/2011 | Inoko     | 359/682 |
| 2002/0181120 | A1 |  | 12/2002 | Nagahara  |         |
| 2006/0187556 | A1 | * | 8/2006 | Inoko     | 359/680 |
| 2008/0247049 | A1 |  | 10/2008 | Inoko     |         |
| 2009/0180199 | A1 |  | 7/2009  | Endo      |         |
| 2011/0149411 | A1 | * | 6/2011 | Inoko     | 359/680 |
| 2013/0070123 | A1 | * | 3/2013 | Imaoka    | 359/683 |

FOREIGN PATENT DOCUMENTS

JP 9-258012 10/1997

\* cited by examiner

*Primary Examiner* — Evelyn A. Lester
(74) *Attorney, Agent, or Firm* — Cozen O'Connor

(57) ABSTRACT

A zoom lens system has, in order from the enlargement side, a first lens group that remains stationary during zooming and that has a negative optical power and a plurality of lens groups that move during zooming. The first lens group includes three lens groups each having a negative optical power, namely a 1$a$-th lens group, a 1$b$-th lens group, and a 1$c$-th lens group. The 1$a$-th lens group remains stationary during focusing and includes at least one positive lens element. The 1$b$-th lens group moves toward the reduction side during focusing from infinity to a close distance. The 1$c$-th lens group moves toward the enlargement side during focusing from infinity to a close distance.

12 Claims, 16 Drawing Sheets

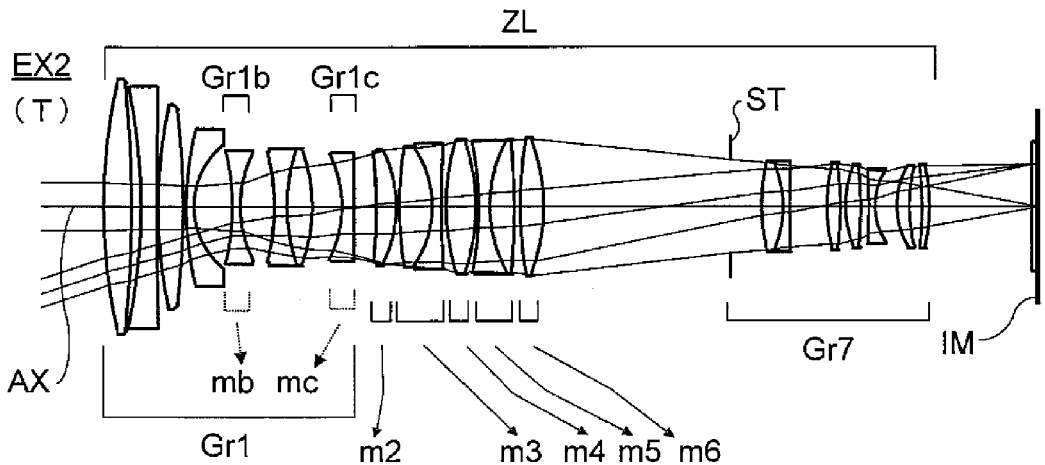
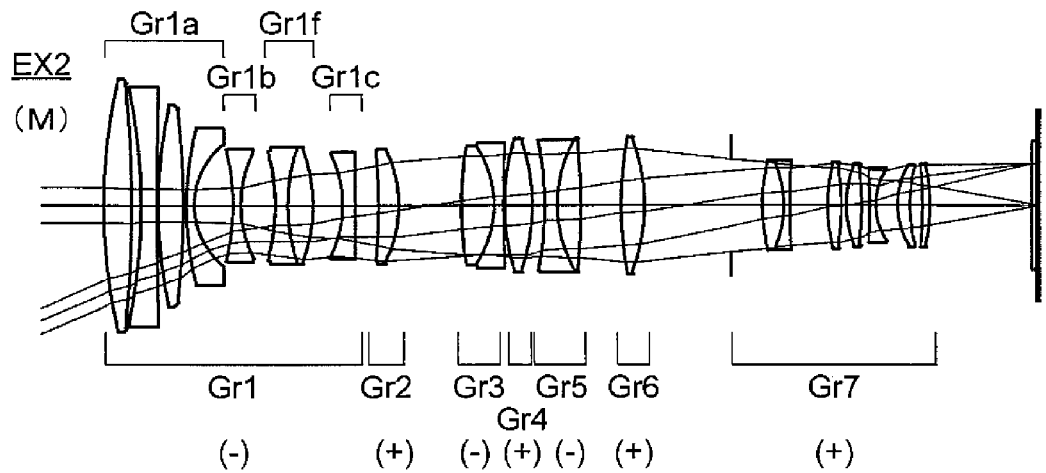
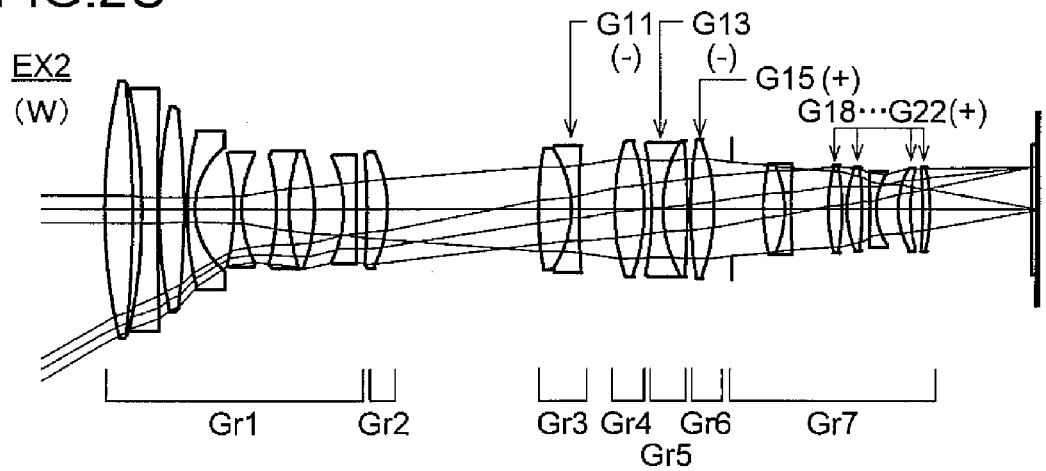

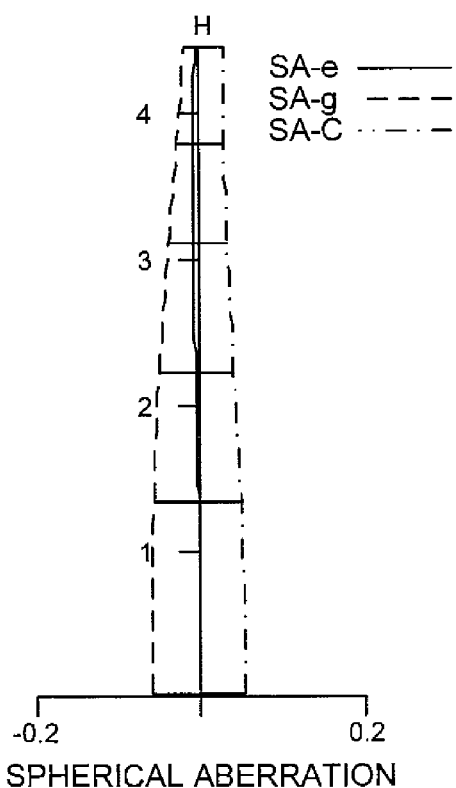
FIG.3A EX1 (T,∞)
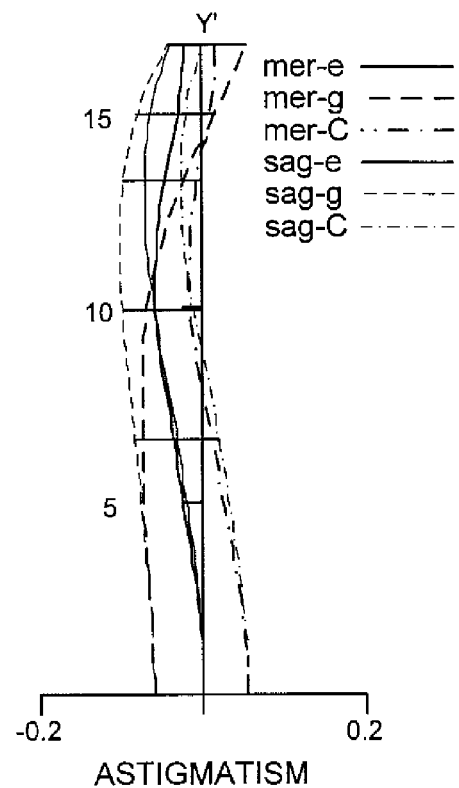
FIG.3B EX1 (T,∞)
SPHERICAL ABERRATION
ASTIGMATISM
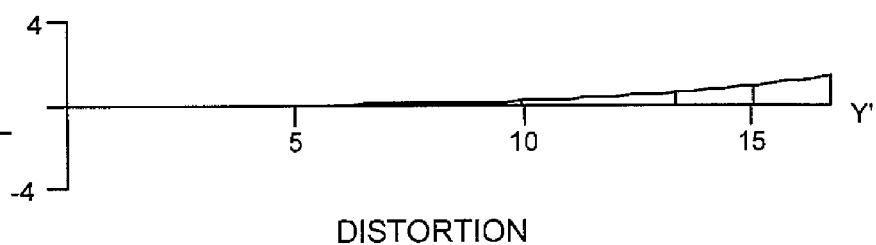
FIG.3C EX1 (T,∞)
DISTORTION
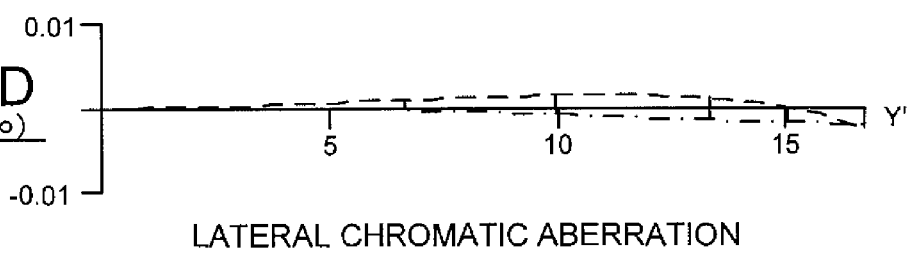
FIG.3D EX1 (T,∞)
LATERAL CHROMATIC ABERRATION

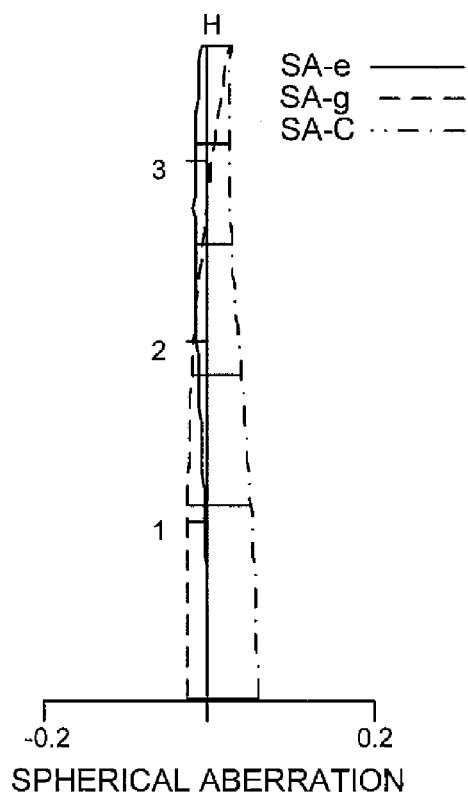
FIG.4A EX1 (T,N)
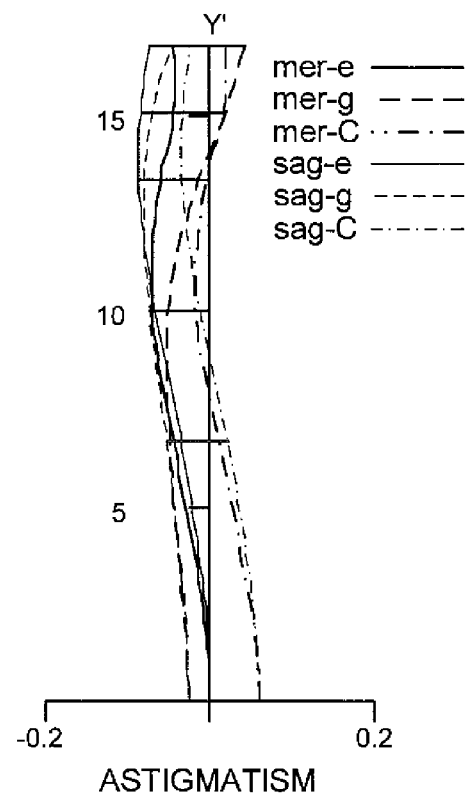
FIG.4B EX1 (T,N)
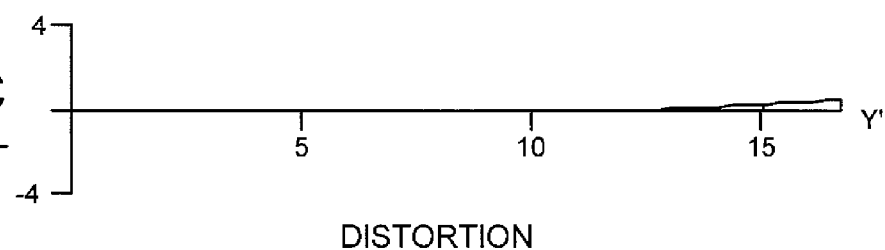
FIG.4C EX1 (T,N)
DISTORTION
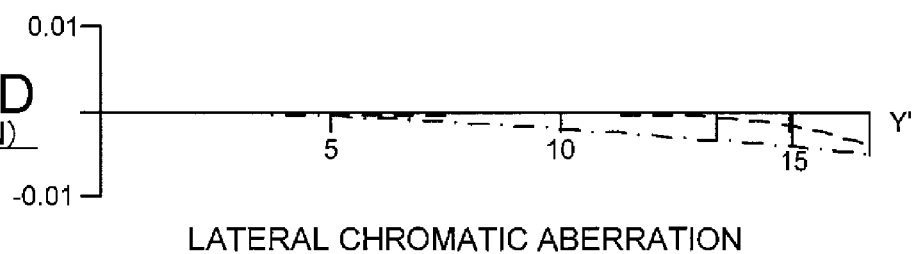
FIG.4D EX1 (T,N)
LATERAL CHROMATIC ABERRATION FIG.5A EX1 (M,∞)
FIG.5B EX1 (M,∞)
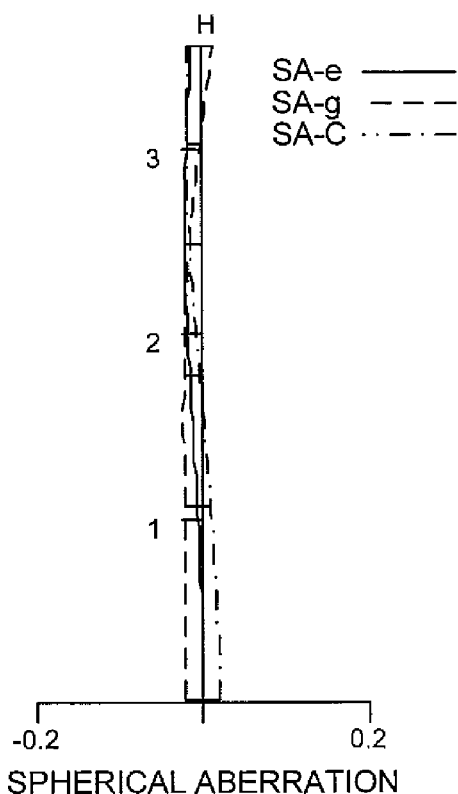
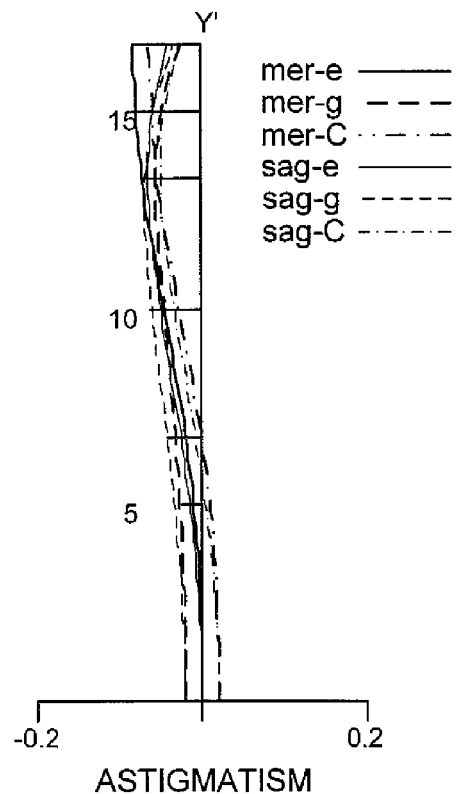
SPHERICAL ABERRATION
ASTIGMATISM
FIG.5C EX1 (M,∞)
DISTORTION
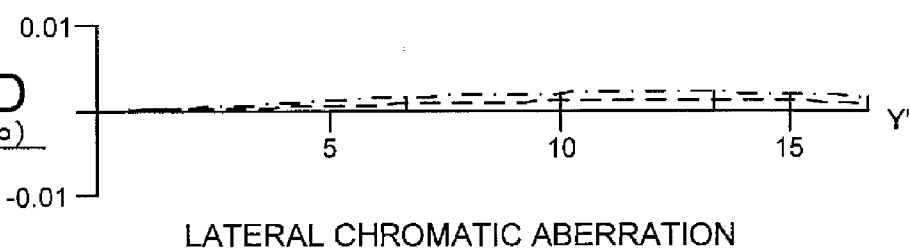
FIG.5D EX1 (M,∞)
LATERAL CHROMATIC ABERRATION FIG.6A EX1 (M,N)
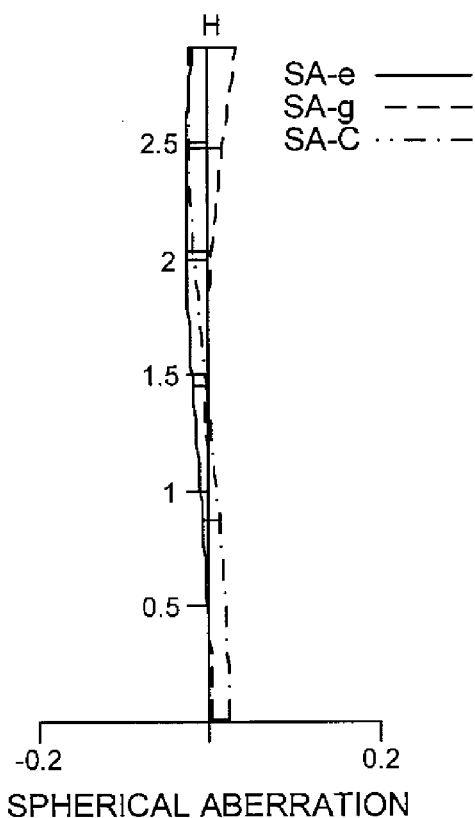
SPHERICAL ABERRATION
FIG.6B EX1 (M,N)
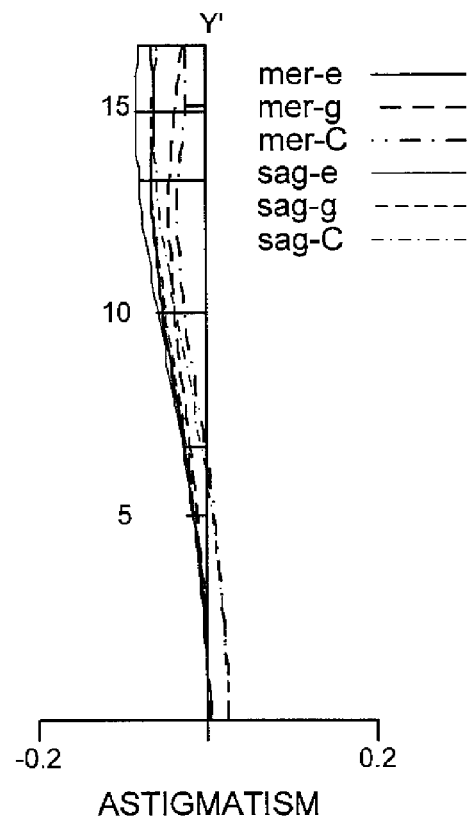
ASTIGMATISM
FIG.6C EX1 (M,N)
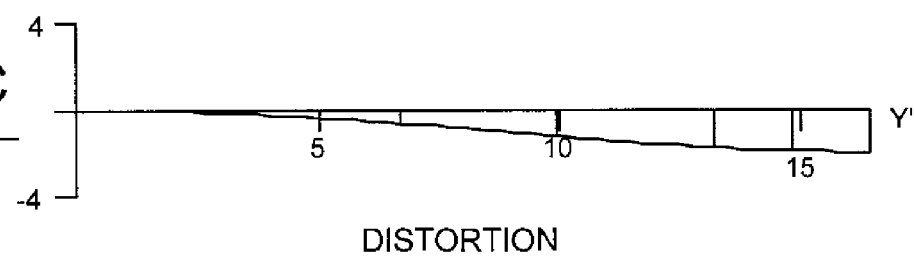
DISTORTION
FIG.6D EX1 (M,N)
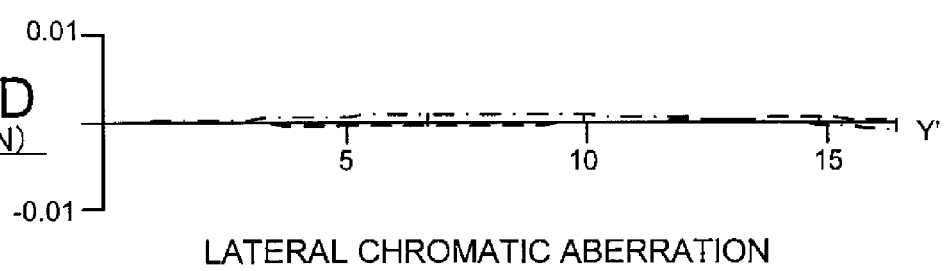
LATERAL CHROMATIC ABERRATION

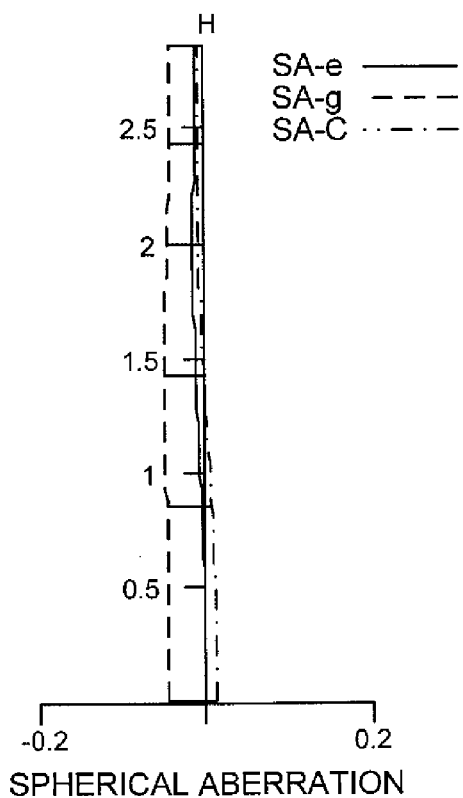
FIG.7A EX1 (W,∞)
SPHERICAL ABERRATION
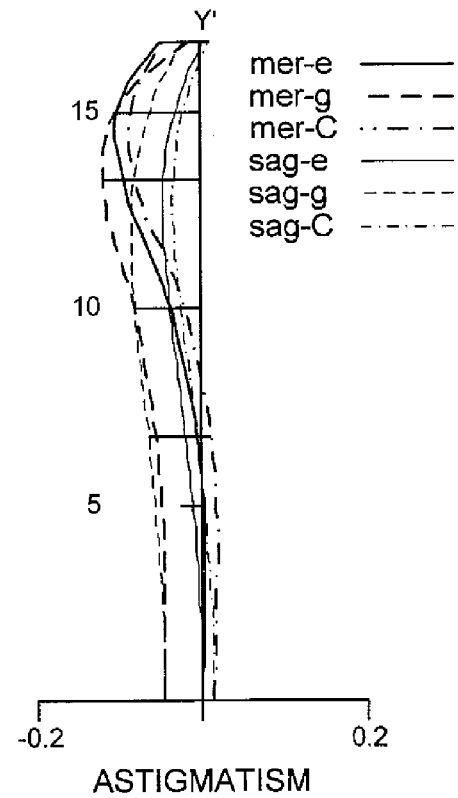
FIG.7B EX1 (W,∞)
ASTIGMATISM
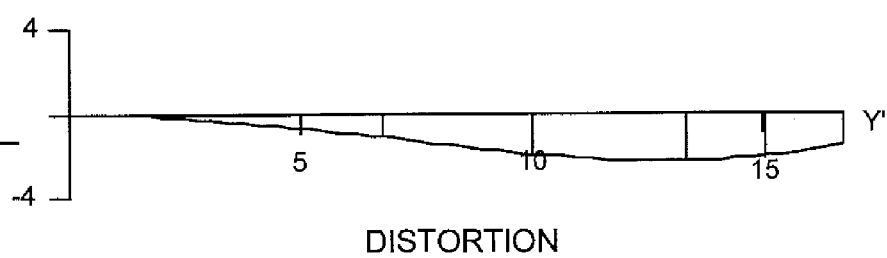
FIG.7C EX1 (W,∞)
DISTORTION
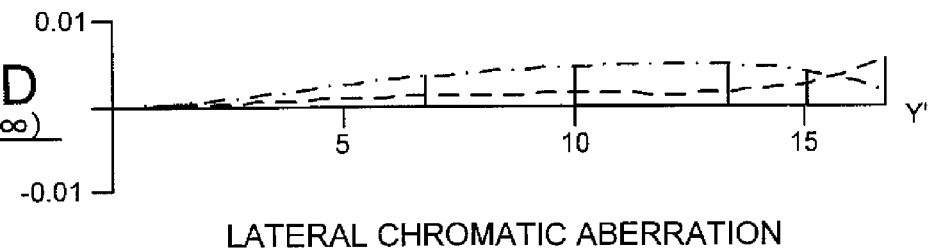
FIG.7D EX1 (W,∞)
LATERAL CHROMATIC ABERRATION

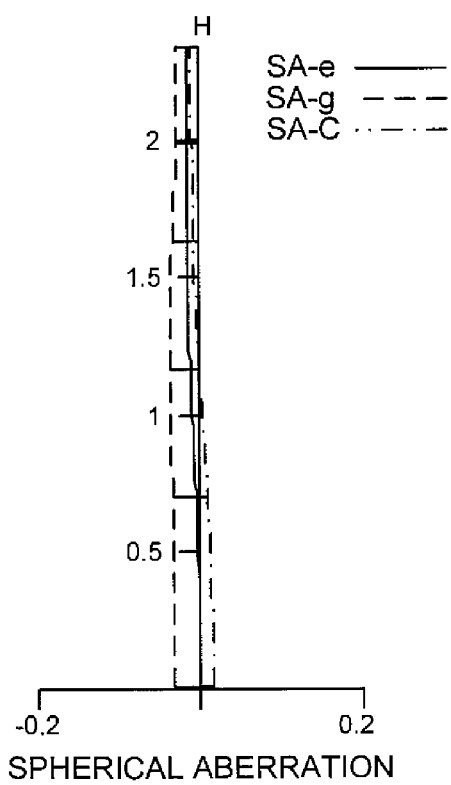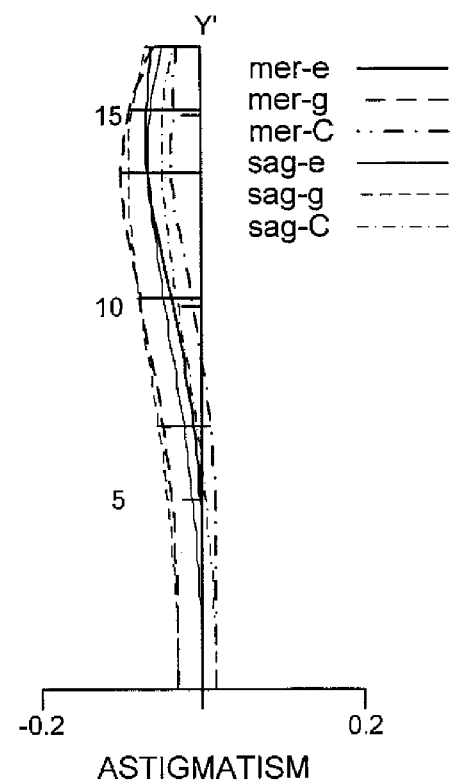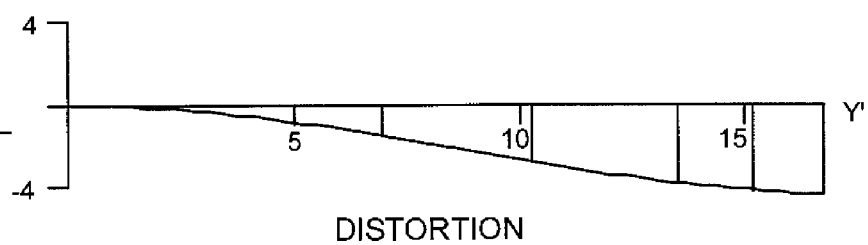

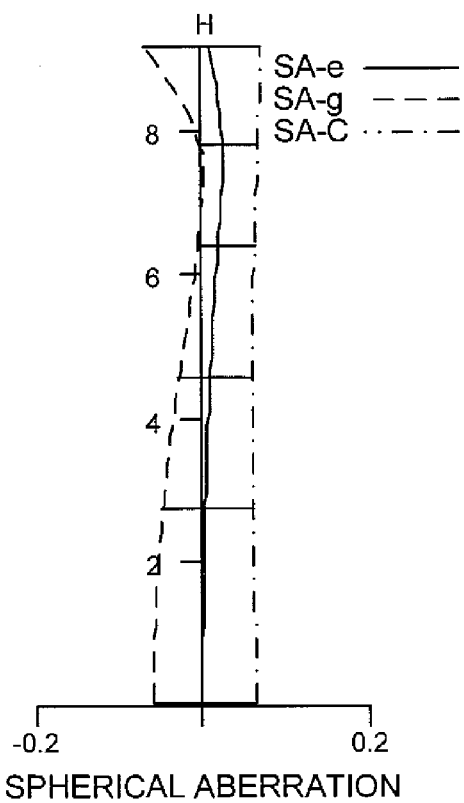
FIG.9A EX2 (T,∞)
SPHERICAL ABERRATION
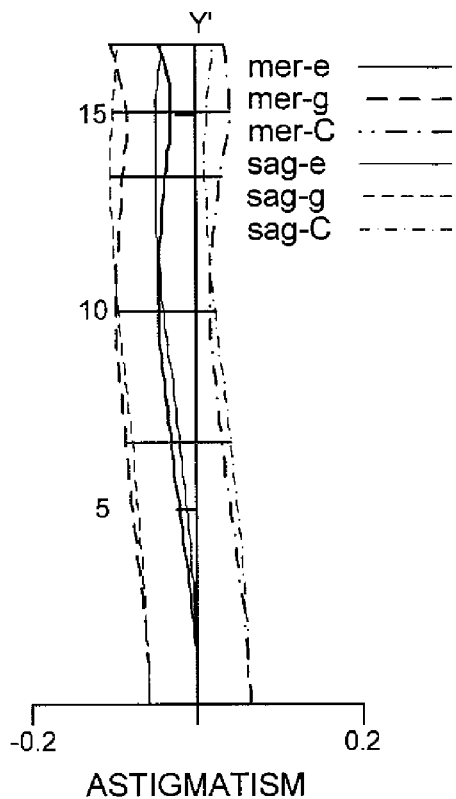
FIG.9B EX2 (T,∞)
ASTIGMATISM
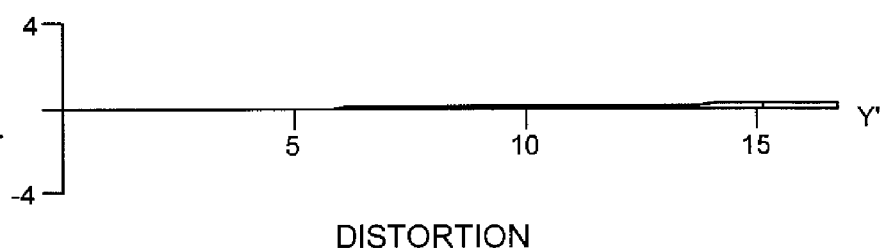
FIG.9C EX2 (T,∞)
DISTORTION
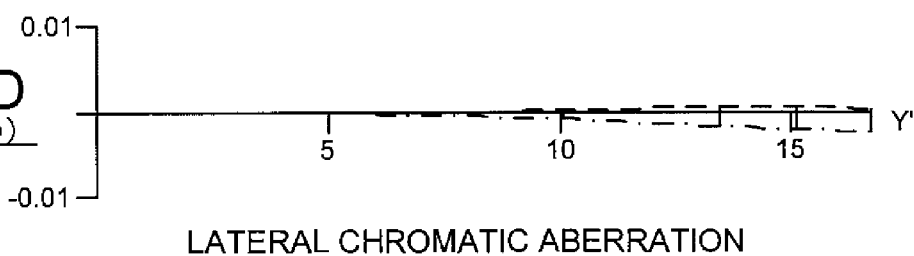
FIG.9D EX2 (T,∞)
LATERAL CHROMATIC ABERRATION FIG.10A EX2 (T,N)
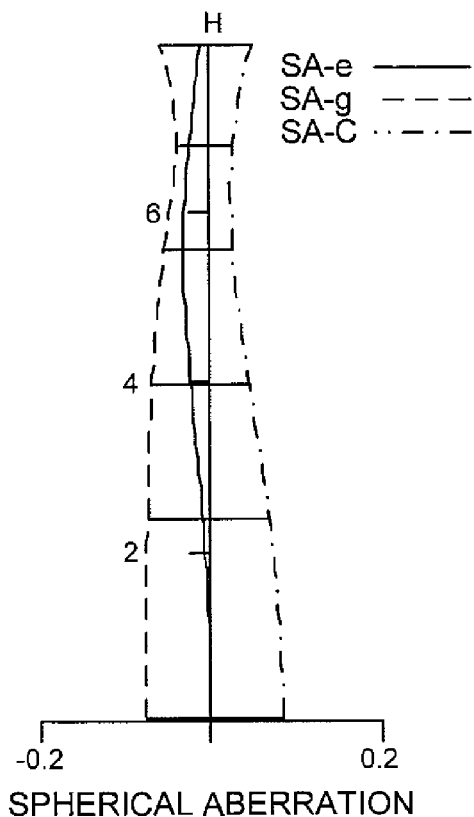
FIG.10B EX2 (T,N)
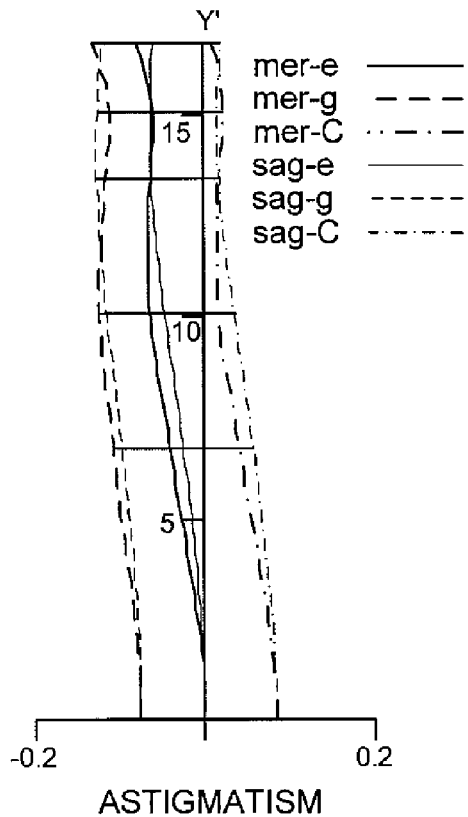
SPHERICAL ABERRATION
ASTIGMATISM
FIG.10C EX2 (T,N)
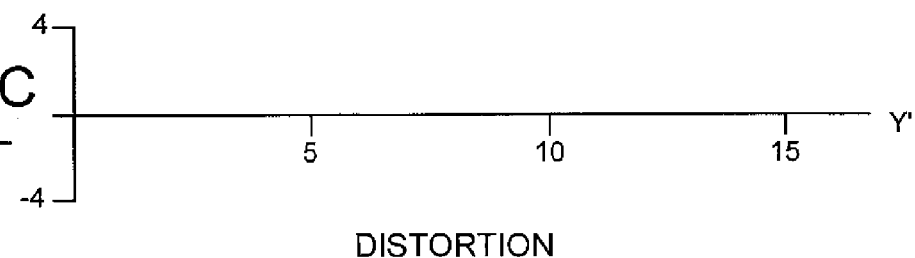
DISTORTION
FIG.10D EX2 (T,N)
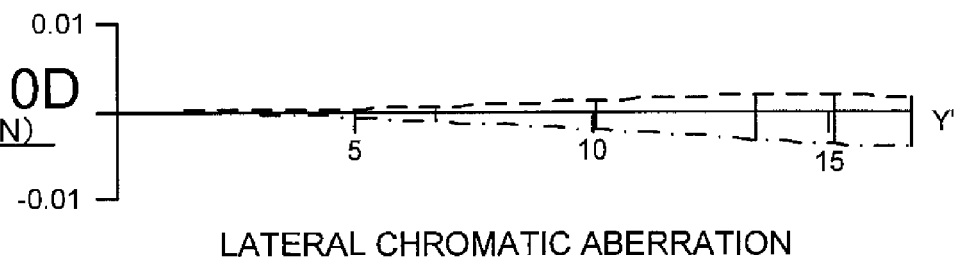
LATERAL CHROMATIC ABERRATION

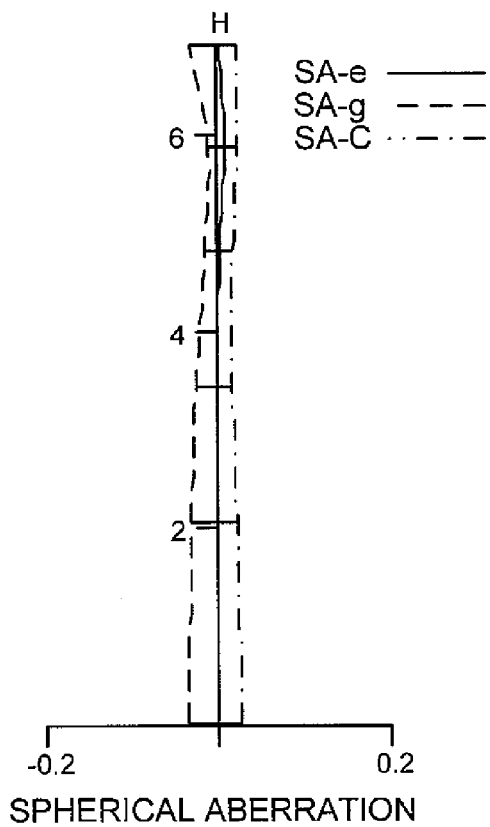
FIG.11A EX2 (M,∞)
SPHERICAL ABERRATION
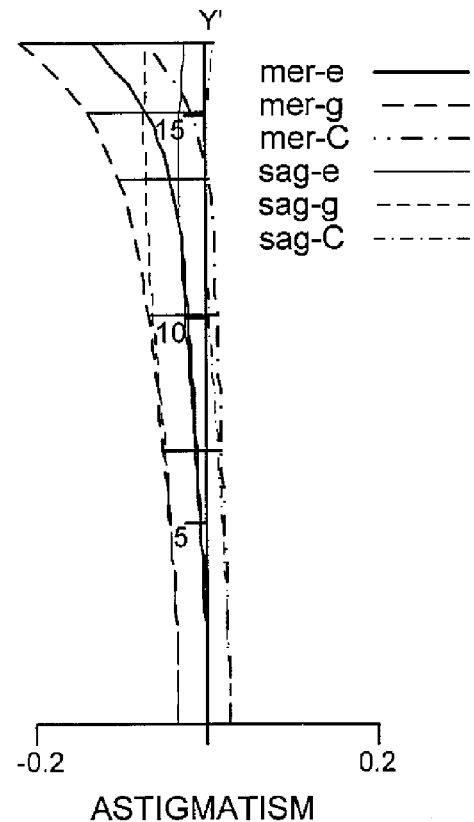
FIG.11B EX2 (M,∞)
ASTIGMATISM
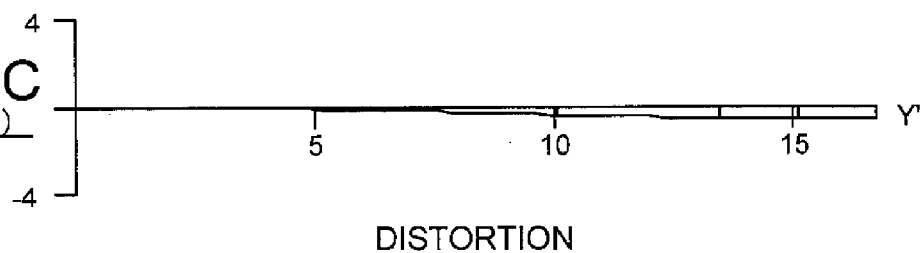
FIG.11C EX2 (M,∞)
DISTORTION
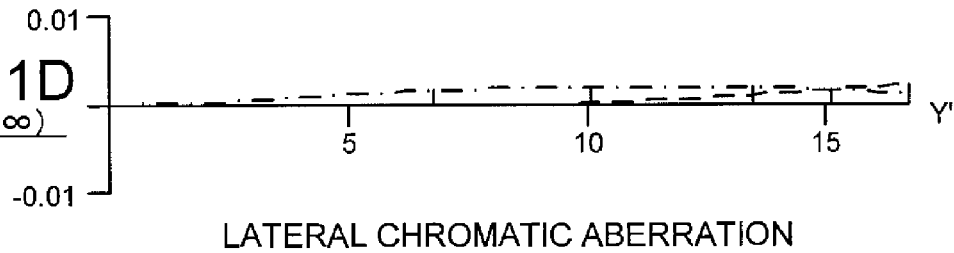
FIG.11D EX2 (M,∞)
LATERAL CHROMATIC ABERRATION

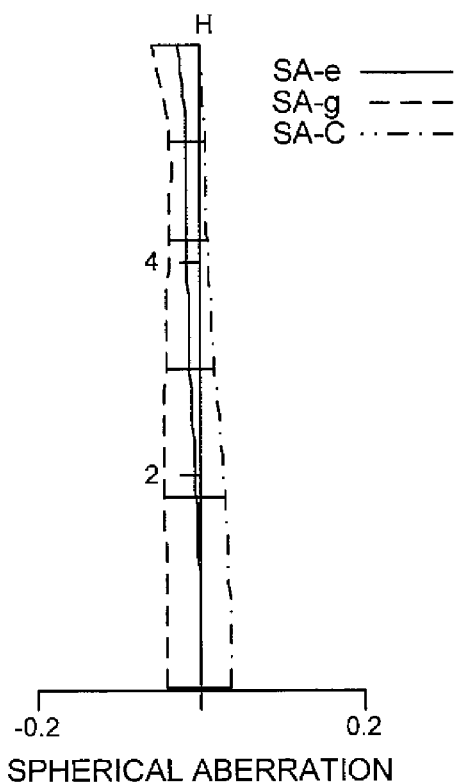
FIG.12A EX2 (M,N)
SPHERICAL ABERRATION
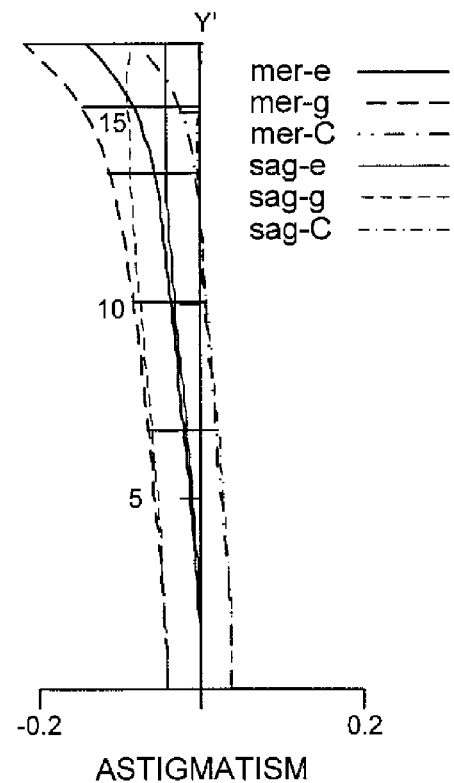
FIG.12B EX2 (M,N)
ASTIGMATISM
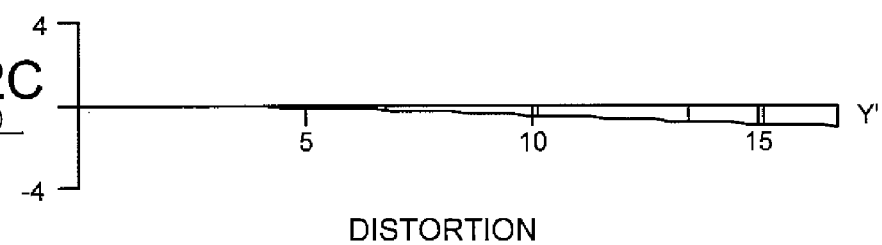
FIG.12C EX2 (M,N)
DISTORTION
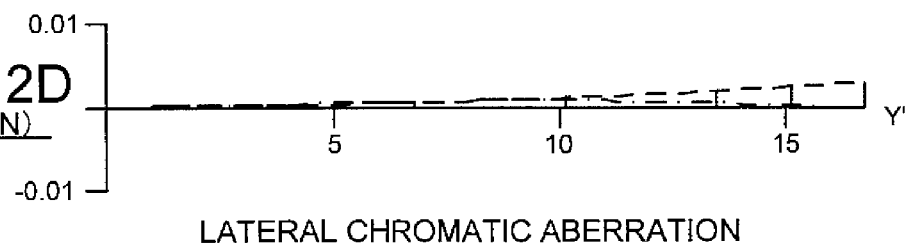
FIG.12D EX2 (M,N)
LATERAL CHROMATIC ABERRATION

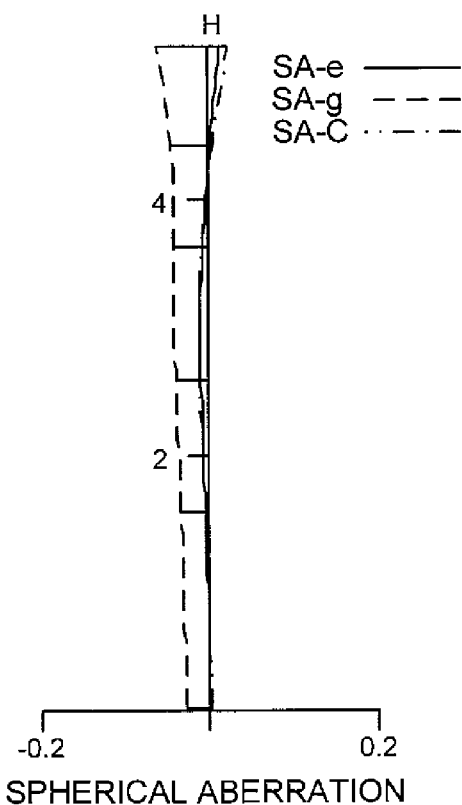
FIG.13A EX2 (W,∞)
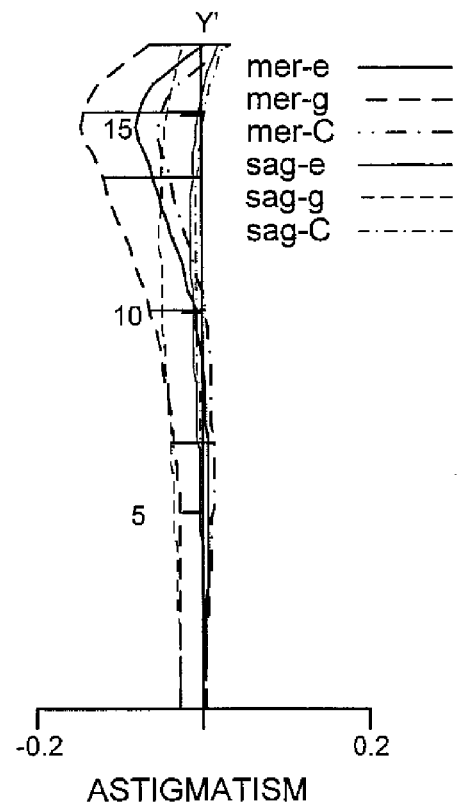
FIG.13B EX2 (W,∞)
SPHERICAL ABERRATION
ASTIGMATISM
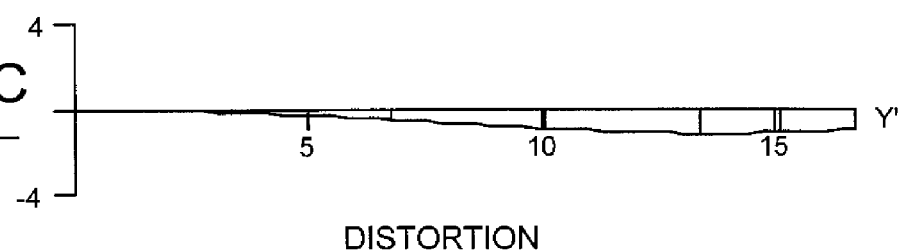
FIG.13C EX2 (W,∞)
DISTORTION
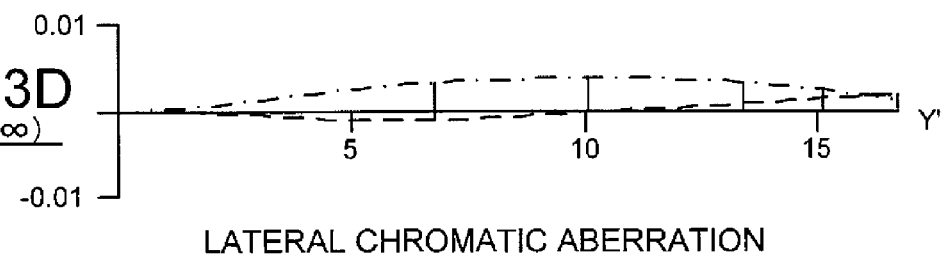
FIG.13D EX2 (W,∞)
LATERAL CHROMATIC ABERRATION FIG.14A EX2 (W,N)
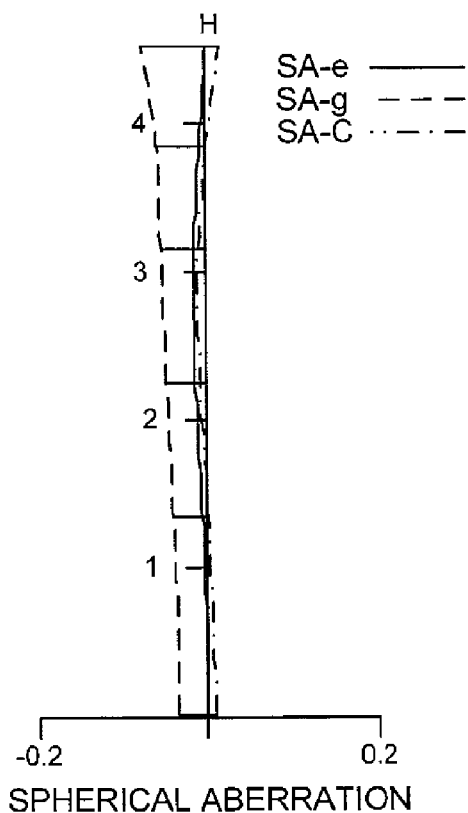
SPHERICAL ABERRATION
FIG.14B EX2 (W,N)
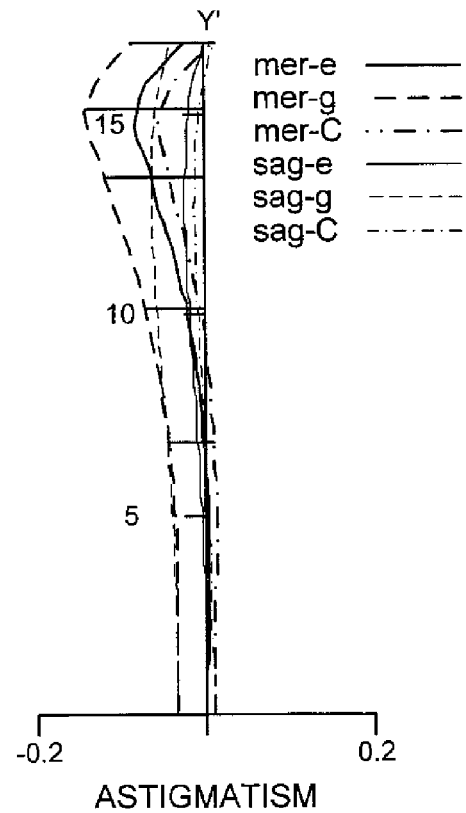
ASTIGMATISM
FIG.14C EX2 (W,N)
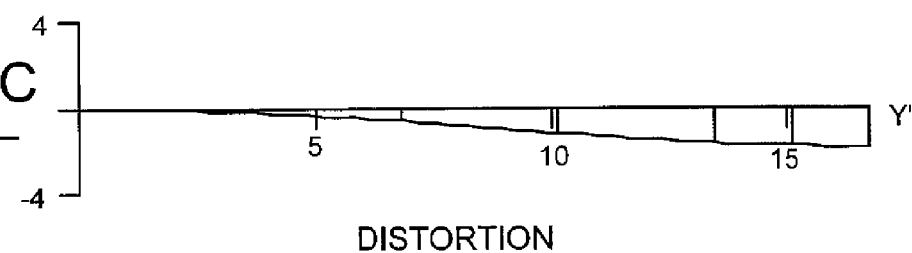
DISTORTION
FIG.14D EX2 (W,N)
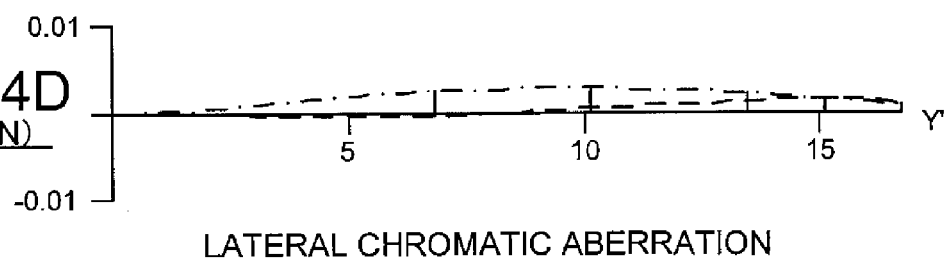
LATERAL CHROMATIC ABERRATION

INNER-FOCUS ZOOM LENS SYSTEM

This application is based on Japanese Patent Application No. 2011-205639 filed on Sep. 21, 2011, the contents of which are hereby incorporated by reference.

BACKGROUND OF THE INVENTION

1. Field of the Invention

The present invention relates to zoom lens systems, and more particularly to wide-angle, compact inner-focus zoom lens systems.

2. Description of Related Art

Allowing the changing of focal length without interchanging lenses, zoom lens systems are advantageous in terms of convenience and cost. Quite often, however, they fail to offer sufficient imaging performance over the entire range of focal length or of conjugate length, and, at close distances in particular, it is difficult to obtain high imaging performance at all. Also difficult is to suppress variation in view angle during focusing from the infinite distance to a close distance, and few techniques to that end have been known. As a solution, a technique called floating involving the use of a plurality of lens groups as focusing lens groups are proposed in Patent Documents 1 to 5 listed below.

For example, Patent Document 1 discloses a zoom lens system of a negative-leading type and that adopts inner-focusing in the second lens group. Patent Document 2 discloses a zoom lens system of a negative-leading type and that adopts focusing a negative and a positive lens group provided in the first lens group. Patent Document 3 discloses a zoom lens system of a negative-leading type and that adopts focusing two negative lens groups provided in the first lens group. Patent Document 4 discloses a zoom lens system of a negative-leading type and that adopts focusing a negative and a positive lens group provided in the first lens group. Patent Document 5 discloses a zoom lens system of a positive-leading type and that includes a first lens group composed of a stationary negative lens group and two positive lens groups, wherein focusing is achieved by moving the two positive lens groups in opposite directions.

Patent Document 1: JP-A-2009-169051
Patent Document 2: JP-A-H11-095100
Patent Document 3: JP-A-2002-357771
Patent Document 4: JP-A-2008-257005
Patent Document 5: JP-A-H09-258102

Inconveniently, in the zoom lens system disclosed in Patent Document 1, a focusing lens group is shared as a zooming lens group, and this results in a large variation in focal length (in view angle) during focusing. In the zoom lens systems disclosed in Patent Documents 2 to 4, all the lens groups within the first lens group are moved, with the natural result that a lens group with a high optical power needs to be moved for focusing; this makes it impossible to suppress variation in view angle. Moreover, in the zoom lens systems disclosed in Patent Documents 1 to 4, the front lens element is movable, and accordingly, to secure a sufficient amount of peripheral light over the entire range of conjugate length, the front lens diameter needs to allow for a margin. In the zoom lens system disclosed in Patent Document 5, the first lens group has a positive optical power, and thus aiming at a wider angle leads to a larger lens diameter.

SUMMARY OF THE INVENTION

Devised against the background discussed above, the present invention aims to provide a wide-angle, compact inner-focus zoom lens system that offers high imaging performance over the entire range of conjugate length from the infinite distance to the closest distance and that operates with little variation in view angle during focusing.

According to one aspect of the invention, a zoom lens system is provided with, in order from the enlargement side, a first lens group that remains stationary during zooming and that has a negative optical power and a plurality of lens groups that move during zooming. The first lens group includes three lens groups each having a negative optical power, and of the three lens groups, the most enlargement-side lens group is a $1a$-th lens group, the lens group located to the reduction side of the $1a$-th lens group is a $1b$-th lens group, and the lens group located to the reduction side of the $1b$-th lens group is a $1c$-th lens group. The $1a$-th lens group remains stationary during focusing and includes at least one positive lens element. The $1b$-th lens group moves toward the reduction side during focusing from infinity to a close distance. The $1c$-th lens group moves toward the enlargement side during focusing from infinity to a close distance.

According to another aspect of the invention, a digital appliance is provided with: a zoom lens system including, in order from the enlargement side, a first lens group that remains stationary during zooming and that has a negative optical power and, a plurality of lens groups that move during zooming; and an image sensor which converts an optical image formed on the sensing surface thereof into an electrical signal. The digital appliance is thereby additionally furnished with at least one of a function of shooting a still image of a subject and a function of shooting a moving image of a subject. The zoom lens system is arranged such that an optical image of a subject is formed on the sensing surface of the image sensor. The first lens group includes three lens groups each having a negative optical power, and of the three lens groups, the most enlargement-side lens group is a $1a$-th lens group, the lens group located to the reduction side of the $1a$-th lens group is a $1b$-th lens group, and the lens group located to the reduction side of the $1b$-th lens group is a $1c$-th lens group. The $1a$-th lens group remains stationary during focusing and includes at least one positive lens element. The $1b$-th lens group moves toward the reduction side during focusing from infinity to a close distance. The $1c$-th lens group moves toward the enlargement side during focusing from infinity to a close distance.

According to yet another aspect of the invention, a projector is provided with: an image display device which displays an image; a light source; an illumination optical system which directs light from the light source to the image display device; and a zoom lens system which projects the image displayed on the image display device onto a screen surface on an enlarged scale. The zoom lens system includes, in a first lens group, three lens groups each having a negative optical power, and of the three lens groups, the most enlargement-side lens group is a $1a$-th lens group, the lens group located to the reduction side of the $1a$-th lens group is a $1b$-th lens group, and the lens group located to the reduction side of the $1b$-th lens group is a $1c$-th lens group. The $1a$-th lens group remains stationary during focusing and includes at least one positive lens element. The $1b$-th lens group moves toward a reduction side during focusing from infinity to a close distance. The $1c$-th lens group moves toward the enlargement side during focusing from infinity to a close distance.

BRIEF DESCRIPTION OF THE DRAWINGS

FIGS. 2A to 2C are optical path diagrams of the second embodiment (Example 2);

FIGS. 3A to 3D are aberration diagrams of Example 1 at the telephoto end, when focusing on the infinite object distance;

FIGS. 4A to 4D are aberration diagrams of Example 1 at the telephoto end, when focusing on the closest object distance;

FIGS. 5A to 5D are aberration diagrams of Example 1 at the middle position, when focusing on the infinite object distance;

FIGS. 6A to 6D are aberration diagrams of Example 1 at the middle position, when focusing on the closest object distance;

FIGS. 7A to 7D are aberration diagrams of Example 1 at the wide-angle end, when focusing on the infinite object distance;

FIGS. 8A to 8D are aberration diagrams of Example 1 at the wide-angle end, when focusing on the closest object distance;

FIGS. 9A to 9D are aberration diagrams of Example 2 at the telephoto end, when focusing on the infinite object distance;

FIGS. 10A to 10D are aberration diagrams of Example 2 at the telephoto end, when focusing on the closest object distance;

FIGS. 11A to 11D are aberration diagrams of Example 2 at the middle position, when focusing on the infinite object distance;

FIGS. 12A to 12D are aberration diagrams of Example 2 at the middle position, when focusing on the closest object distance;

FIGS. 13A to 13D are aberration diagrams of Example 2 at the wide-angle end, when focusing on the infinite object distance;

FIGS. 14A to 14D are aberration diagrams of Example 2 at the wide-angle end, when focusing on the closest object distance;

DETAILED DESCRIPTION OF PREFERRED EMBODIMENTS

Figure 1A:
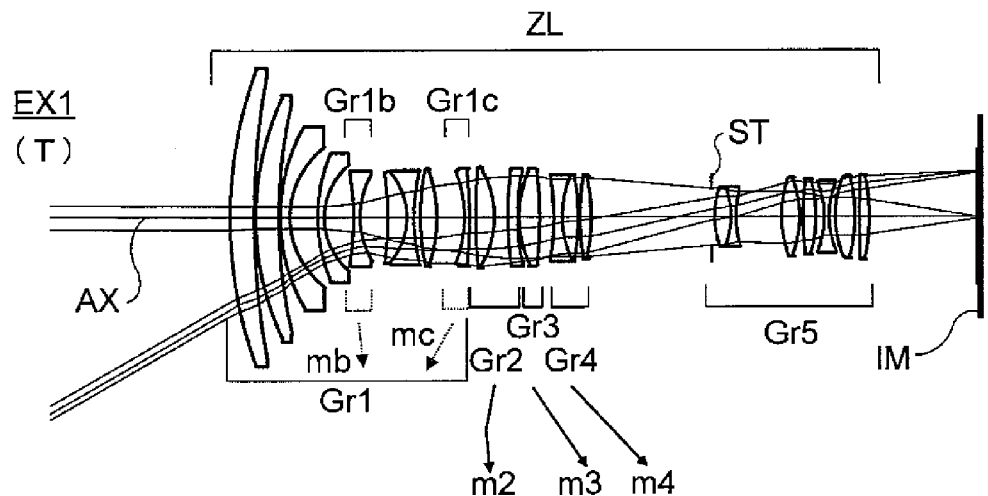
FIGS. 1A to 1C are optical path diagrams of the first embodiment (Example 1)

Hereinafter, zoom lens systems etc. according to the present invention will be described. A zoom lens system according to the invention includes, in order from the enlargement-side, a first lens group that remains stationary during zooming and that has a negative optical power and a plurality of lens groups that move for zooming (an optical power being a quantity defined as the reciprocal of a focal length). The first lens group includes three lens groups each having a negative optical power, and of these three lens groups, the most enlargement-side lens group is a $1a$-th lens group, the lens group located to the reduction-side of the $1a$-th lens group is a $1b$-th lens group, and the lens group located to the reduction-side of the $1b$-th lens group is a $1c$-th lens group. The $1a$-th lens group remains stationary during focusing and includes at least one positive lens element. The $1b$-th lens group moves toward the reduction side during focusing from infinity to a close distance. The $1c$-th lens group moves toward the enlargement side during focusing from infinity to a close distance.

Giving the first lens group a negative optical power makes it easy to obtain a wide view angle. Moving a plurality of lens groups having moderate optical powers for focusing makes it possible to obtain high imaging performance while controlling variation in view angle over the entire range of conjugate length from the infinite distance to the closest distance. Accordingly, providing a stationary lens group (corresponding to the $1a$-th lens group) and giving it a negative optical power is effective. Giving all the lens groups negative optical powers helps reduce the respective optical powers of the stationary and moving lens groups, and this is advantageous to aberration correction. Moreover, moving the movable lens groups (corresponding to the $1b$-th and $1c$-th lens groups) in opposite directions helps reduce variation in view angle during focusing.

In the first lens group, which has a negative optical power as a whole, providing a positive lens element in the most enlargement-side $1a$-th lens group and giving the succeeding $1b$-th and $1c$-th lens groups negative optical powers makes it possible to correct distortion and lateral chromatic aberration efficiently even at wide view angles close to 90 degrees. Keeping the $1a$-th lens group having a negative optical power stationary and moving the other, namely the $1b$-th and $1c$-th, lens groups having negative optical powers individually makes it possible to correct variation in curvature of field and in distortion effectively while suppressing variation in view angle during focusing. Moreover, keeping the $1a$-th lens group stationary eliminates the need to secure a margin in the front lens diameter, and thus makes it possible to make the lens barrel small and hence the total length short. It also makes it easy to obtain dust-proof and drip-proof effects, increased resistance to impact, and other advantages.

With a zoom lens system having the distinctive construction described above, it is possible to obtain high imaging performance over the entire range of conjugate length from the infinite distance to the closest distance, to reduce variation in view angle during focusing, and to achieve a wide view angle combined with compactness. By employing such a zoom lens system in digital appliances such as digital cameras and projectors, it is possible to furnish the digital appliances additionally with high-performance image input and output capabilities while keeping them lightweight and compact. This contributes to making digital appliances compact, low-cost, high-performance, versatile, and otherwise better. The conditions etc. for striking a good balance among those benefits, and for achieving higher optical performance, further compactness, etc., will now be discussed.

It is preferable that conditional formula (1) below be fulfilled:

$$2 < f1a/f1 < 10 \tag{1}$$

where f1 represents the focal length of the first lens group, and
f1a represents the focal length of the $1a$-th lens group.

By fulfilling conditional formula (1), it is possible to correct distortion and curvature of field satisfactorily while suppressing an increase in the front lens diameter. Under the lower limit of conditional formula (1), the optical power of the $1a$-th lens group is so high that larger distortion and curvature of field may result. Over the upper limit of the conditional formula (1) also, larger distortion and curvature of field may result, and in addition a larger front lens diameter results.

It is preferable that conditional formula (1a) below be fulfilled, and it is further preferable that conditional formula (1b) below be fulfilled:

$$2 < f1a/f1 < 8 \tag{1a}$$

$$2 < f1a/f1 < 6 \tag{1b}$$

These conditional formulae (1a) and (1b) define, within the conditional range defined by conditional formula (1) above, conditional ranges that should further preferably be fulfilled out of the above-mentioned and other considerations. Accordingly, by fulfilling preferably conditional formula (1a), and more preferably conditional formula (1b), it is possible to obtain more of the benefits mentioned above.

It is preferable that conditional formulae (2) and (3) below be fulfilled:

$$1 < f1b/f1 < 5 \quad (2)$$

$$2 < f1c/f1 < 10 \quad (3)$$

where
f1 represents the focal length of the first lens group,
f1 b represents the focal length of the 1b-th lens group, and
f1 c represents the focal length of the 1c-th lens group.

By fulfilling the conditional formulae (2) and (3), it is possible to correct aberrations with a good balance over the entire range of conjugate length while achieving a wide view angle. Under the lower limit of conditional formula (2) or (3), the optical power of the focusing lens group is so high that it is difficult to correct curvature of field and lateral chromatic aberration with a good balance over the entire range of conjugate length. It is then also difficult to keep the view angle constant. Over the upper limit of conditional formula (2) or (3), the optical power of the focusing lens group is so low that it is not possible to focus on a close distance.

It is preferable that conditional formula (2a) below be fulfilled, and it is further preferable that conditional formula (2b) below be fulfilled:

$$1 < f1b/f1 < 3.5 \quad (2a)$$

$$1 < f1b/f1 < 3 \quad (2b)$$

These conditional formulae (2a) and (2b) define, within the conditional range defined by conditional formula (2) above, conditional ranges that should further preferably be fulfilled out of the above-mentioned and other considerations. Accordingly, by fulfilling preferably conditional formula (2a), and more preferably conditional formula (2b), it is possible to obtain more of the benefits mentioned above.

It is preferable that conditional formula (3a) below be fulfilled, and it is further preferable that conditional formula (3b) below be fulfilled:

$$2 < f1c/f1 < 8 \quad (3a)$$

$$2 < f1c/f1 < 6 \quad (3b)$$

These conditional formulae (3a) and (3b) define, within the conditional range defined by conditional formula (3) above, conditional ranges that should further preferably be fulfilled out of the above-mentioned and other considerations. Accordingly, by fulfilling preferably conditional formula (3a), and more preferably conditional formula (3b), it is possible to obtain more of the benefits mentioned above.

Zoom lens systems according to the invention are suitable as imaging lens systems in digital appliances furnished with an image input capabilities, and can be combined with an image sensor or the like to build imaging optical devices which take in an image of a subject optically and output it in the form of an electrical signal. An imaging optical device is an optical device that constitutes a main component of cameras that are used to take still and moving images of subjects, and is composed of, for example, in order from the object side (that is, from the subject side), a zoom lens system which forms an optical image of an object and an image sensor which converts the optical image formed by the zoom lens system into an electrical signal. By arranging a zoom lens system having the distinctive construction described above in such a way that an optical image of a subject is formed on the sensing surface (that is, imaging surface) of an image sensor, it is possible to realize a compact, low-cost, high-zoom-ratio, high-performance imaging optical device and a digital appliance incorporating it.

Examples of digital appliances furnished with an image input capability include cameras such as cinematographic cameras, digital cameras, video cameras, surveillance cameras, vehicle-mounted cameras, and videophone cameras; and cameras incorporated in, or externally attached to, personal computers, digital devices (for example, compact, portable information device terminals such as cellular phones and mobile computers), peripheral devices for those (such as scanners and printers), and other digital devices. As will be understood from these examples, not only can an imaging optical device be used to build cameras, but an imaging optical device can also be incorporated in various devices to add camera capabilities to them. For example, it is possible to build digital appliances furnished with an image input capability such as camera-equipped projectors.

Figure 16A:
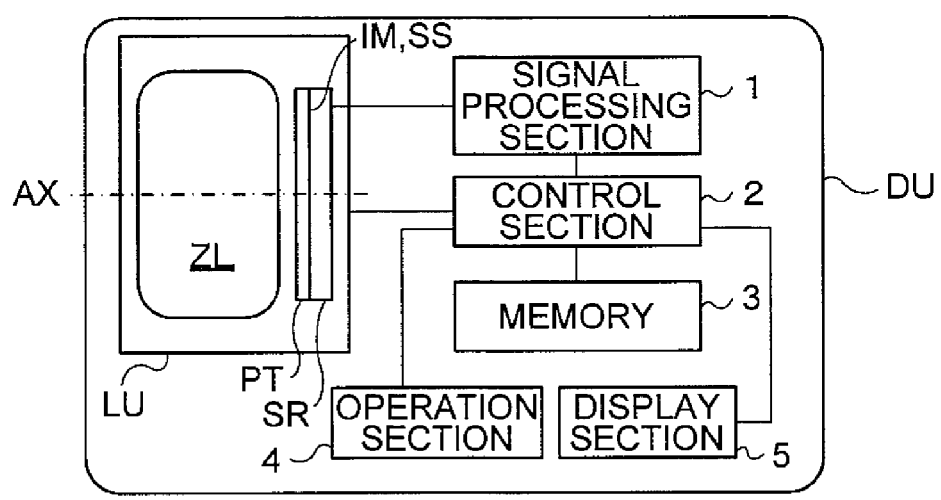
FIGS. 16A and 16B are each a schematic diagram showing an example of an outline configuration of a digital appliance incorporating a zoom lens system.

FIG. 16A shows, in a schematic sectional view, an example of an outline configuration of a digital appliance DU furnished with an image input capability. The digital appliance DU shown in FIG. 16A incorporates an imaging optical device LU, which includes, in order from the object side (that is, the subject side), a zoom lens system ZL (with AX representing the optical axis) which forms an optical image (image surface) IM of an object at variable magnification; a parallel-plane plate PT (corresponding to the cover glass of an image sensor SR and optical filters arranged as necessary, such as an optical low-pass filter and an infrared cut filter); and an image sensor SR which converts the optical image IM formed on its sensing surface SS by the zoom lens system ZL into an electrical signal. When this imaging optical device LU is used to build a digital appliance DU furnished with an image input capability, the former is typically housed inside the body of the latter; to realize camera capabilities, any suitable manner of implementation may be adopted. For example, an imaging optical device LU built as a unit may be designed to be removable from, or rotatable relative to, the body of a digital appliance DU.

The zoom lens system ZL achieves magnification variation (that is, zooming) by moving a plurality of zooming movable lens groups individually along the optical axis AX such that the group-to-group interval or intervals between them vary. The zoom lens system ZL achieves focusing (inner focusing) by moving two focusing lens groups within the most object-side (enlargement-side) zooming lens group individually along the optical axis AX. The zoom lens system ZL forms the optical image IM on the sensing surface SS of the image sensor SR. Used as the image sensor SR is, for example, a solid-state image sensor, such as a CCD (charge-coupled device) image sensor or a CMOS (complementary metal-oxide semiconductor) image sensor, that has a plurality of pixels. The zoom lens system ZL is arranged such that the optical image IM of the subject is formed on the sensing surface SS, which is the photoelectric conversion portion of the image sensor SR, and thus the optical image IM formed by the zoom lens system ZL is converted into an electrical signal by the image sensor SR.

The digital appliance DU includes, in addition to the imaging optical device LU, a signal processing section 1, a control section 2, a memory 3, an operation section 4, a display section 5, etc. The signal generated by the image sensor SR is subjected to predetermined digital image processing, image compression, etc. as necessary in the signal processing section 1, and the resulting digital video signal is recorded on the memory 3 (a semiconductor memory, an optical disc, or the like) and, as the case may be, transmitted to an external device via a cable or after being converted into an infrared signal or the like (for example, the communication capabilities of a cellular phone). The control section 2 includes a microcomputer, and governs, in a concentrated fashion, the control of functions such as image shooting functions (such as still image shooting and moving image shooting functions) and image playback functions; the control of lens movement mechanisms for zooming, focusing, image stabilization, etc.; and other control. For example, the control section 2 controls the imaging optical device LU to perform at least one of the shooting of a still image of the subject and the shooting of a moving image of the subject. The display section 5 includes a display device such as a liquid crystal monitor, and displays an image based on the image signal resulting from the conversion by the image sensor SR or based on image information recorded on the memory 3. The operation section 4 includes operated members such as operation buttons (for example, a shutter release button), an operation dial (for example, a shooting mode dial), etc., and conveys the information that the user enters by operating those to the control section 2.

Figure 1B:
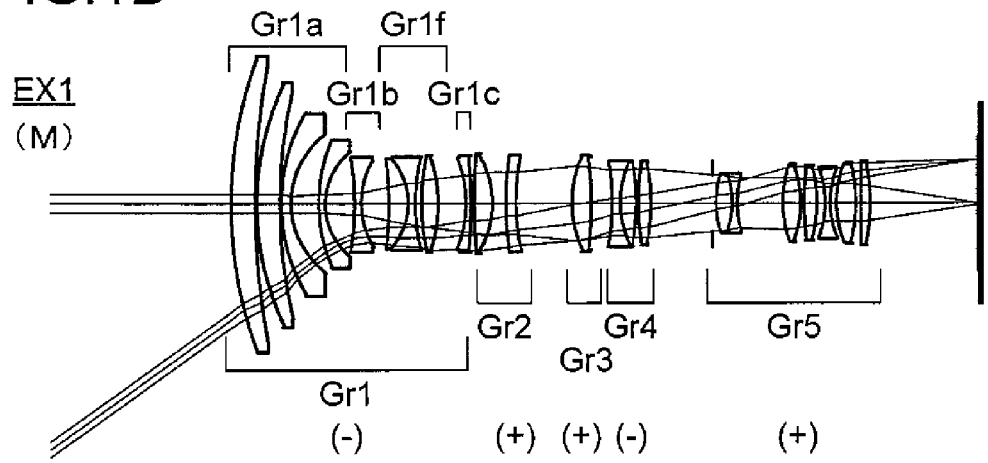
Figure 1C:
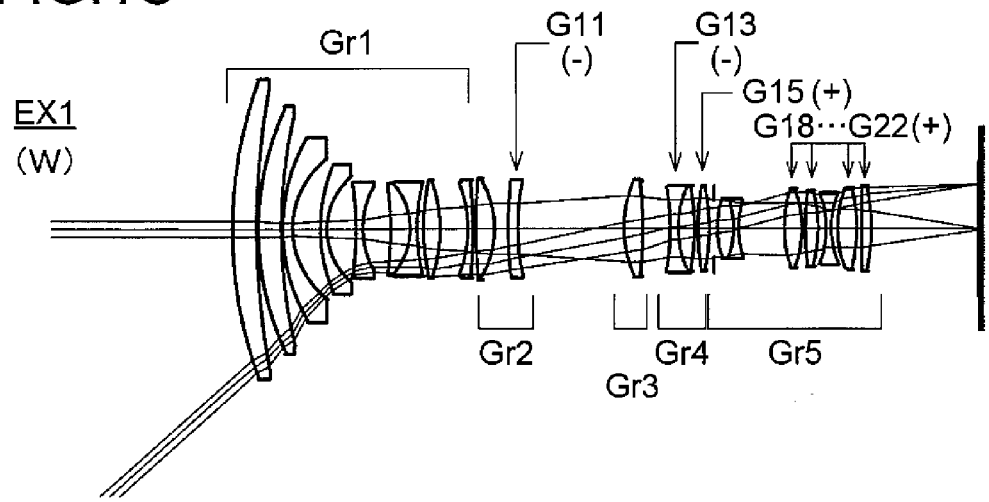

Now, by way of a first and a second embodiment, specific optical constructions of the zoom lens system ZL will be described in more detail. FIGS. 1A to 1C and FIGS. 2A to 2C are optical path diagrams of the zoom lens system ZL in the first and second embodiments respectively, FIGS. 1A and 2A showing, in an optical section, the lens arrangement, optical path, etc. at the telephoto end (T), FIGS. 1B and 2B showing those at the middle position (M, the middle-focal-length condition), and FIGS. 1C and 2C showing those at the wide-angle end (W). In FIGS. 1A and 2A, an arrow mi (where i=2, 3, . . . ) schematically indicates the movement of the i-th lens group Gri for zooming from the telephoto end (T) to the wide-angle end (W), and arrows mb and mc schematically indicate the movement of the 1b-th and 1c-th lens groups Gr1b and Gr1c, respectively, for focusing from the infinite object distance to the closest object distance. A j-th lens element Gj is, of all the constituent lens elements, the j-th one as counted from the enlargement side.

In both the first and second embodiments (FIGS. 1 and 2), the zoom lens system ZL is so constructed as to achieve zooming by, while keeping as stationary lens groups the most enlargement-side (object-side) zooming lens group and the most reduction-side (image-side) zooming lens group (with an aperture stop ST located at the enlargement-side end in the last lens group), moving as movable lens groups the other zooming lens groups along the optical axis AX. For example, in the first embodiment (FIGS. 1A to 1C), the zoom lens system ZL has a five-group construction with a negative, a positive, a positive, a negative, and a positive optical power in order from the enlargement-side, wherein the first and fifth lens groups Gr1 and Gr5 are stationary lens groups, and the second to fourth lens groups Gr2 to Gr4 are movable lens groups. In the second embodiment (FIGS. 2A to 2C), the zoom lens system ZL has a seven-group construction with a negative, a positive, a negative, a positive, a negative, a positive, and a positive optical power in order from the enlargement-side, wherein the first and seventh lens groups Gr1 and Gr7 are stationary lens groups, and the second to sixth lens groups Gr2 to Gr6 are movable lens groups.

The first lens group Gr1, which remains stationary during zooming and which has a negative optical power, is composed of four lens groups, specifically, in order from the enlargement-side, a 1a-th lens group Gr1a, a 1b-th lens group Gr1b, a 1f-th lens group Gr1f, and a 1c-th lens group Gr1c. Of these four lens groups, the 1a-th, 1b-th, and 1c-th lens groups Gr1a, Gr1b, and Gr1c have negative optical powers, and the 1a-th and 1f-th lens groups Gr1a and Gr1f remain stationary during focusing. The 1a-th lens group Gr1a includes at least one positive lens element, the 1b-th lens group Gr1b moves toward the reduction side during focusing from infinity to a close distance, and the 1c-th lens group Gr1c moves toward the enlargement side during focusing from infinity to a close distance.

Figure 15:
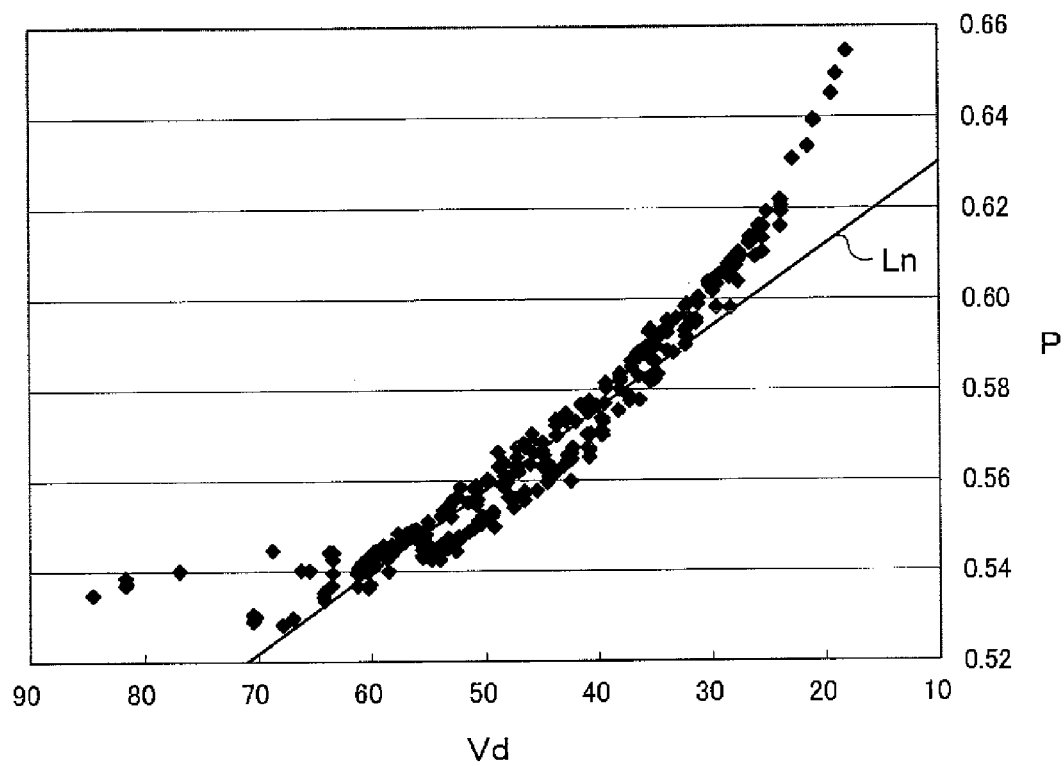
FIG. 15 is a graph showing a relationship between the Abbe number and the partial dispersion ratio of optical glasses.

In the first and second embodiments, the fifteenth lens element G15 (FIGS. 1A to 2C and 2A to 2C) is made of quartz glass. With quartz glass, which has standard anomalous dispersion, it is possible to correct focus deviation satisfactorily without increasing chromatic aberration. In the graph in FIG. 15, quartz glass is plotted at an Abbe number Vd=67.72 and a partial dispersion ratio P=0.524; it thus exhibits standard anomalous dispersion and does not increase chromatic aberration. Quartz glass also has a sufficiently high transmittance of 99.9% (with a thickness of 10 mm) at a wavelength of 350 nm, and can keep a good color balance. Moreover, with quartz glass, which has a high rate dN/dT, specifically $9.9 \times 10^{-6}$, of variation in refractive index accompanying variation in temperature, it is possible to correct the focus deviation occurring in the positive lens element, and to prevent degradation in image quality.

Figure 16B:
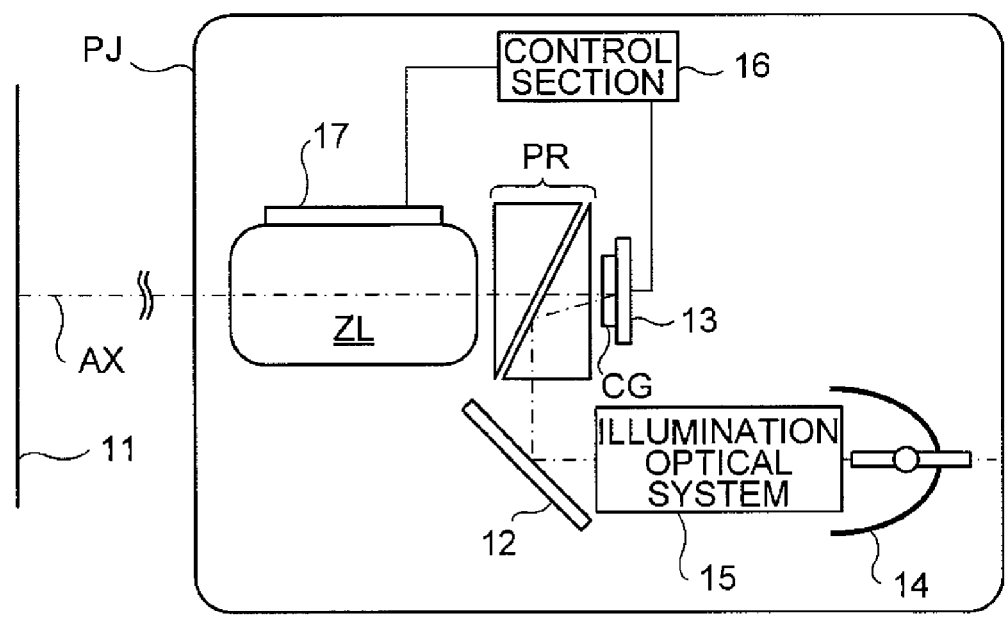

Next, a projector embodying the invention to which the zoom lens system ZL is applied will be described. FIG. 16B shows an example of an outline configuration of a projector PJ. The projector PJ includes the zoom lens system ZL, a reflection mirror 12, an image display device 13, a light source 14, an illumination optical system 15, a control section 16, a prism PR, etc. The control section 16 governs the overall control of the projector PJ. The image display device 13 is an image modulation device which modulates light to generate an image, and has cover glass CG fitted on its display surface where it displays an image. The light from the light source 14 is directed through the illumination optical system 15, via the reflection mirror 12 and the prism PR, to the image display device 13. The prism PR is, for example, a TIR (total internal reflection) prism (or a color splitting/integrating prism, or the like), and separates between illumination and projection light. The image displayed on the image display device 13 is projected onto a screen surface 11 through the zoom lens system ZL on an enlarged scale.

Each lens group that is moved for zooming or focusing is fitted with an actuator 17 by which it is moved toward the enlargement side or toward the reduction side along the optical axis AX. Each actuator 17 is connected to the control section 16 for the control of the movement of movable lens groups. The control section 16 and the actuator 17 may be omitted; that is, lens groups may instead be moved manually.

According to the construction of the zoom lens system ZL incorporated in the digital appliance DU mentioned previously and in the projector PJ here, owing to the inner-focus construction in which the first lens group having a negative optical power includes three distinctive lens groups each having a negative optical power, it is possible to obtain high imaging performance over the entire range of conjugate length from the infinite distance to the closest distance, to reduce variation in view angle during focusing, and to achieve a wide view angle combined with compactness.

EXAMPLES

The construction etc. of zoom lens systems embodying the invention will now be described more specifically, with reference to the construction data etc. of practical examples. Examples 1 and 2 (EX1, EX2) presented below are numerical examples corresponding to the above-described first and second embodiments respectively, and the optical path diagrams (FIGS. 1A to 1C and 2A to 2C) of the first and second embodiments also show the lens arrangement, optical path, etc. of the corresponding ones of Examples 1 and 2 respectively.

The construction data of each example includes the following. Listed as surface data are, from the leftmost column rightward, surface number i, radius of curvature r (mm), axial distance d (mm), refractive index Nd for the d-line (with a wavelength of 587.6 nm), and Abbe number Vd for the d-line. Listed as miscellaneous data are zoom ratio and, for each of the different focal length conditions (T), (M), and (W), focal length (FL, mm) of the entire system, f-number (FNO), image height (Y', mm), lens total length (TL, mm), back focal length (BF, mm), magnification when focusing on the closest object distance (near-end magnification), half view angle when focusing on the infinite object distance (infinity ω, °), half view angle when focusing on the closest object distance (near-end ω, °), view angle variation (%); also listed are variable axial distances di (i representing the surface number, mm), that is, axial distances that vary during zooming and focusing. Listed as zooming lens group data are the focal length (mm) of those lens groups. In both examples, the variation in view angle from infinity to the close-up distance is successfully suppressed to about 2%.

The back focal length BF is given as an air equivalent length from the last lens surface to the paraxial image surface IM, and the lens total length TL is the sum of the distance from the foremost lens surface to the last lens surface and the back focal length. The symbols (T, ∞), (M, ∞), and (W, ∞) indicate variable axial distances di in the different focal length conditions (T), (M), and (W) when focusing on the infinite object distance, and the symbols (T, N), (M, N), and (W, N) indicate variable axial distances di in the different focal length conditions (T), (M), and (W) when focusing on the closest object distance. Table 1 lists the values corresponding to the conditional formulae in each example.

FIGS. 3A-3D, 4A-4D, 5A-5D, 6A-6D, 7A-7D, and 8A-8D and FIGS. 9A-9D, 10A-10D, 11A-11D, 12A-12D, 13A-13D, and 14A-14D are aberration diagrams of Examples 1 and 2 (EX1 and EX2) respectively. FIGS. 3A-3D, 4A-4D, 9A-9D, and 10A-10D show aberrations at the telephoto end (T), FIGS. 5A-5D, 6A-6D, 11A-11D, and 12A-12D show aberrations at the middle position (M), and FIGS. 7A-7D, 8A-8D, 13A-13D, and 14A-14D show aberrations at the wide-angle end (W). FIGS. 3A-3D, 5A-5D, 7A-7D, 9A-9D, 11A-11D, and 13A-13D show aberrations when focusing on the infinite object distance (infinity position, ∞), and FIGS. 4A-4D, 6A-6D, 8A-8D, 10A-10D, 12A-12D, and 14A-14D show aberrations when focusing on the closest object distance (near-end position, N).

Of all these aberration diagrams, those suffixed with A show spherical aberration (mm), those suffixed with B show astigmatism (mm), those suffixed with C show distortion (%), and those suffixed with D show lateral chromatic aberration (H representing the height of incidence (mm), and Y' representing the image height (mm)). In the spherical aberration diagrams suffixed with A, the solid line SA-e represents the spherical aberration for the e-line (with a wavelength of 546.1 nm), the broken line SA-g represents the spherical aberration for the g-line (with a wavelength of 435.8 nm), and the dash-and-dot line SA-C represents the spherical aberration for the C-line (with a wavelength of 656.3 nm). In the astigmatism diagrams suffixed with B, the bold lines mer-e, mer-g, and mer-C represent the meridional surface, and the fine lines sag-e, sag-g, and sag-C represent the sagittal surface, the solid lines mer-e and sag-e representing the astigmatism for the e-line (with a wavelength of 546.1 nm), the broken lines mer-g and sag-g representing the astigmatism for the g-line (with a wavelength of 435.8 nm), and the dash-and-dot lines mer-C and sag-C representing the astigmatism for the C-line (with a wavelength of 656.3 nm). In the astigmatism diagrams suffixed with C, the solid line represents the distortion (%) for the e-line. In the lateral chromatic aberration diagram suffixed with D, the broken line represents the lateral chromatic aberration for the g-line (with a wavelength of 435.8 nm), and the dash-and-dot line represents the lateral chromatic aberration for the C-line (with a wavelength of 656.3 nm).

Example 1

| | | | | |
|---|---|---|---|---|
| | | Unit: mm | | |
| | | Surface Data | | |
| i | r | d | Nd | Vd |
| 1 | 166.067 | 8.632 | 1.69680 | 55.5 |
| 2 | 301.160 | 0.500 | | |
| 3 | 112.627 | 8.511 | 1.71300 | 53.9 |
| 4 | 191.882 | 0.500 | | |
| 5 | 70.555 | 3.387 | 1.72916 | 54.7 |
| 6 | 34.168 | 9.893 | | |
| 7 | 62.893 | 2.371 | 1.72916 | 54.7 |
| 8 | 26.769 | Variable (Focus) | | |
| 9 | −113.546 | 1.393 | 1.80518 | 25.5 |
| 10 | 32.822 | Variable (Focus) | | |
| 11 | −134.227 | 7.178 | 1.59270 | 35.5 |
| 12 | −26.596 | 0.010 | | |
| 13 | −26.596 | 1.676 | 1.48749 | 70.4 |
| 14 | 77.321 | 2.448 | | |
| 15 | 93.911 | 6.396 | 1.59270 | 35.5 |
| 16 | −58.472 | Variable (Focus) | | |
| 17 | −48.591 | 1.692 | 1.65412 | 39.7 |
| 18 | −196.645 | Variable (Focus & Zoom) | | |

-continued

Unit: mm

| | | | | |
|---|---|---|---|---|
| 19 | 297.717 | 7.272 | 1.48749 | 70.4 |
| 20 | −38.451 | 3.983 | | |
| 21 | 133.494 | 3.558 | 1.88300 | 40.8 |
| 22 | 84.814 | Variable (Zoom) | | |
| 23 | 43.901 | 8.081 | 1.54814 | 45.8 |
| 24 | −158.261 | Variable (Zoom) | | |
| 25 | −93.075 | 2.343 | 1.88300 | 40.8 |
| 26 | 40.177 | 0.010 | | |
| 27 | 40.177 | 6.403 | 1.48749 | 70.4 |
| 28 | −88.944 | 0.500 | | |
| 29 | 105.024 | 4.726 | 1.45847 | 67.7 |
| 30 | −77.381 | Variable (Zoom) | | |
| 31 (Aperture) | ∞ | 1.450 | | |
| 32 | 37.279 | 6.540 | 1.59270 | 35.5 |
| 33 | −33.425 | 0.010 | | |
| 34 | −33.425 | 0.839 | 1.83481 | 42.7 |
| 35 | 42.507 | 16.896 | | |
| 36 | 45.752 | 6.869 | 1.49700 | 81.6 |
| 37 | −43.520 | 0.500 | | |
| 38 | 118.174 | 5.360 | 1.49700 | 81.6 |
| 39 | −53.071 | 2.917 | | |
| 40 | −38.455 | 1.024 | 1.88300 | 40.8 |
| 41 | 34.631 | 2.815 | | |
| 42 | 42.958 | 7.497 | 1.49700 | 81.6 |
| 43 | −62.483 | 1.000 | | |
| 44 | 828.643 | 4.132 | 1.49700 | 81.6 |
| 45 | −75.958 | 38.000 | | |
| 46 | ∞ | 1.000 | 1.51680 | 64.2 |
| 47 | ∞ | 1.000 | | |
| 48 | ∞ | | | |

Miscellaneous Data
Zoom Ratio 1.61

| | (T) | (M) | (W) |
|---|---|---|---|
| FL | 29.0 | 22.5 | 18.0 |
| FNO | 3.15 | 3.15 | 3.15 |
| Y' | 16.8 | 16.8 | 16.8 |
| TL | 271.2 | 271.2 | 271.2 |
| BF | 39.7 | 39.7 | 39.7 |
| Near-End Magnification | −0.0914 | −0.0733 | −0.0588 |
| Infinity ω (°) | 31.0 | 36.8 | 43.0 |
| Near-End ω (°) | 30.7 | 36.4 | 42.2 |
| View Angle Variation (%) | −0.81 | −1.08 | −1.86 |

| | (T, ∞) | (M, ∞) | (W, ∞) | (T, N) | (M, N) | (W, N) |
|---|---|---|---|---|---|---|
| d8 | 11.642 | 11.642 | 11.642 | 14.515 | 14.515 | 14.515 |
| d10 | 10.761 | 10.761 | 10.761 | 7.888 | 7.888 | 7.888 |
| d16 | 9.995 | 9.995 | 9.995 | 5.261 | 5.261 | 5.261 |
| d18 | 1.666 | 0.440 | 0.586 | 6.400 | 5.174 | 5.320 |
| d22 | 0.500 | 20.335 | 38.408 | 0.500 | 20.335 | 38.408 |
| d24 | 5.292 | 7.328 | 9.866 | 5.292 | 7.328 | 9.866 |
| d30 | 42.392 | 21.748 | 0.991 | 42.392 | 21.748 | 0.991 |

Zooming Lens Group Data

| Group | Start Surface | Focal Length |
|---|---|---|
| 1 | 1 | −16.876 |
| 2 | 19 | 90.121 |
| 3 | 23 | 63.265 |
| 4 | 25 | −498.206 |
| 5 | 31 | 98.491 |

Example 2

| | | Unit: mm | | |
|---|---|---|---|---|
| | | Surface Data | | |
| i | r | d | Nd | Vd |
| 1 | 232.913 | 11.380 | 1.72916 | 54.7 |
| 2 | −489.850 | 3.200 | | |
| 3 | −238.540 | 5.623 | 1.59270 | 35.3 |
| 4 | 1555.364 | 0.500 | | |
| 5 | 196.039 | 9.989 | 1.48749 | 70.2 |
| 6 | −332.424 | 0.500 | | |
| 7 | 132.022 | 3.039 | 1.60300 | 65.4 |
| 8 | 32.308 | Variable (Focus) | | |
| 9 | −89.867 | 2.188 | 1.75700 | 47.8 |
| 10 | 48.827 | Variable (Focus) | | |
| 11 | −87.815 | 4.211 | 1.51633 | 64.1 |
| 12 | 75.048 | 0.010 | | |
| 13 | 75.048 | 10.000 | 1.83481 | 42.7 |
| 14 | −66.499 | Variable (Focus) | | |
| 15 | −48.310 | 4.102 | 1.51633 | 64.1 |
| 16 | 22216.872 | Variable (Focus & Zoom) | | |
| 17 | −229.144 | 7.547 | 1.48749 | 70.2 |
| 18 | −52.104 | Variable (Zoom) | | |
| 19 | 154.427 | 12.826 | 1.62041 | 60.3 |
| 20 | −43.677 | 0.010 | | |
| 21 | −43.677 | 2.789 | 1.88300 | 40.8 |
| 22 | 508.663 | Variable (Zoom) | | |
| 23 | 94.235 | 11.528 | 1.59270 | 35.3 |
| 24 | −82.541 | Variable (Zoom) | | |
| 25 | −129.135 | 3.802 | 1.88300 | 40.8 |
| 26 | 55.274 | 0.010 | | |
| 27 | 55.274 | 9.918 | 1.62041 | 60.3 |
| 28 | −291.945 | Variable (Zoom) | | |
| 29 | 165.719 | 9.394 | 1.45847 | 67.7 |
| 30 | −78.365 | Variable (Zoom) | | |
| 31 (Aperture) | ∞ | 11.827 | | |
| 32 | 76.438 | 8.529 | 1.59270 | 35.3 |
| 33 | −43.225 | 0.010 | | |
| 34 | −43.225 | 2.051 | 1.88300 | 40.8 |
| 35 | 334.850 | 13.683 | | |
| 36 | 67.342 | 6.036 | 1.49700 | 81.5 |
| 37 | −109.202 | 1.056 | | |
| 38 | 43.363 | 6.935 | 1.49700 | 81.5 |
| 39 | −135.874 | 2.515 | | |
| 40 | −245.042 | 1.805 | 1.88300 | 40.8 |
| 41 | 26.368 | 8.339 | | |
| 42 | 32.941 | 4.642 | 1.49700 | 81.5 |
| 43 | 66.609 | 5.264 | | |
| 44 | −166.832 | 3.237 | 1.49700 | 81.5 |
| 45 | −73.012 | 38.000 | | |
| 46 | ∞ | 2.000 | 1.51633 | 64.1 |
| 47 | ∞ | 1.000 | | |
| 48 | ∞ | | | |

-continued

Unit: mm

Miscellaneous Data
Zoom Ratio 1.77

|  | (T) | (M) | (W) |
|---|---|---|---|
| FL | 49.5 | 37.2 | 28.0 |
| FNO | 2.70 | 2.70 | 2.70 |
| Y' | 16.8 | 16.8 | 16.8 |
| TL | 353.3 | 353.3 | 353.3 |
| BF | 40.3 | 40.3 | 40.3 |
| Near-End Magnification | −0.0861 | −0.0648 | −0.0487 |
| Infinity ω (°) | 18.7 | 24.4 | 31.2 |
| Near-End ω (°) | 18.6 | 24.4 | 31.1 |
| View Angle Variation (%) | −0.36 | −0.23 | −0.37 |

|  | (T, ∞) | (M, ∞) | (W, ∞) | (T, N) | (M, N) | (W, N) |
|---|---|---|---|---|---|---|
| d8 | 15.368 | 15.368 | 15.368 | 17.757 | 17.757 | 17.757 |
| d10 | 13.570 | 13.570 | 13.570 | 11.181 | 11.181 | 11.181 |
| d14 | 10.909 | 10.909 | 10.909 | 6.223 | 6.223 | 6.223 |
| d16 | 9.107 | 9.672 | 5.000 | 13.793 | 14.358 | 9.687 |
| d18 | 0.500 | 23.045 | 56.281 | 0.500 | 23.045 | 56.281 |
| d22 | 2.183 | 0.500 | 13.480 | 2.183 | 0.500 | 13.480 |
| d24 | 1.206 | 4.532 | 2.901 | 1.206 | 4.532 | 2.901 |
| d28 | 1.728 | 14.458 | 0.500 | 1.728 | 14.458 | 0.500 |
| d30 | 69.938 | 32.456 | 6.500 | 69.938 | 32.456 | 6.500 |

Zooming Lens Group Data

| Group | Start Surface | Focal Length |
|---|---|---|
| 1 | 1 | −31.396 |
| 2 | 17 | 135.953 |
| 3 | 19 | −282.245 |
| 4 | 23 | 75.571 |
| 5 | 25 | −106.051 |
| 6 | 29 | 117.051 |
| 7 | 31 | 200.591 |

TABLE 1

|  |  | Example 1 | Example 2 |
|---|---|---|---|
|  | f1 | −16.876 | −31.396 |
|  | f1a | −50.288 | −139.680 |
|  | f1b | −31.191 | −41.299 |
|  | f1c | −98.508 | −92.999 |
| Formula (1) | f1a/f1 | 2.980 | 4.449 |
| Formula (2) | f1b/f1 | 1.848 | 1.315 |
| Formula (3) | f1c/f1 | 5.837 | 2.962 |

What is claimed is:

1. A zoom lens system comprising, in order from an enlargement side, a first lens group that remains stationary during zooming and that has a negative optical power and a plurality of lens groups that move during zooming, wherein
the first lens group includes three lens groups each having a negative optical power,
of the three lens groups, a most enlargement-side lens group is a 1$a$-th lens group, a lens group located to a reduction side of the 1$a$-th lens group is a 1$b$-th lens group, and a lens group located to a reduction side of the 1$b$-th lens group is a 1$c$-th lens group,
the 1$a$-th lens group remains stationary during focusing and includes at least one positive lens element,
the 1$b$-th lens group moves toward a reduction side during focusing from infinity to a close distance, and
the 1$c$-th lens group moves toward the enlargement side during focusing from infinity to a close distance.

2. The zoom lens system according to claim 1, wherein conditional formula (1) below is fulfilled:

$$2 < f1a/f1 < 10 \tag{1}$$

where
f1 represents a focal length of the first lens group, and
f1$a$ represents a focal length of the 1$a$-th lens group.

3. The zoom lens system according to claim 1, wherein conditional formulae (2) and (3) below are fulfilled:

$$1 < f1b/f1 < 5 \tag{2}$$

$$2 < f1c/f1 < 10 \tag{3}$$

where
f1 represents a focal length of the first lens group,
f1 b represents a focal length of the 1$b$-th lens group, and
f1 c represents a focal length of the 1$c$-th lens group.

4. The zoom lens system according to claim 2, wherein conditional formulae (2) and (3) below are fulfilled:

$$1 < f1b/f1 < 5 \tag{2}$$

$$2 < f1c/f1 < 10 \tag{3}$$

where
f1 represents a focal length of the first lens group,
f1 b represents a focal length of the 1$b$-th lens group, and
f1 c represents a focal length of the 1$c$-th lens group.

5. A digital appliance comprising:
a zoom lens system comprising, in order from an enlargement side, a first lens group that remains stationary during zooming and that has a negative optical power and a plurality of lens groups that move during zooming; and an image sensor which converts an optical image formed on a sensing surface thereof into an electrical signal, the digital appliance being thereby additionally furnished with at least one of a function of shooting a still image of a subject and a function of shooting a moving image of a subject, wherein the zoom lens system is arranged such that an optical image of a subject is formed on the sensing surface of the image sensor, the first lens group includes three lens groups each having a negative optical power, of the three lens groups, a most enlargement-side lens group is a $1a$-th lens group, a lens group located to a reduction side of the $1a$-th lens group is a $1b$-th lens group, and a lens group located to a reduction side of the $1b$-th lens group is a $1c$-th lens group, the $1a$-th lens group remains stationary during focusing and includes at least one positive lens element, the $1b$-th lens group moves toward a reduction side during focusing from infinity to a close distance, and the $1c$-th lens group moves toward the enlargement side during focusing from infinity to a close distance.

6. The digital appliance according to claim 5, wherein conditional formula (1) below is fulfilled:

$$2 < f1a/f1 < 10 \quad (1)$$

where
f1 represents a focal length of the first lens group, and
f1a represents a focal length of the $1a$-th lens group.

7. The digital appliance according to claim 5, wherein conditional formulae (2) and (3) below are fulfilled:

$$1 < f1b/f1 < 5 \quad (2)$$

$$2 < f1c/f1 < 10 \quad (3)$$

where
f1 represents a focal length of the first lens group,
f1 b represents a focal length of the $1b$-th lens group, and
f1 c represents a focal length of the $1c$-th lens group.

8. The digital appliance according to claim 6, wherein conditional formulae (2) and (3) below are fulfilled:

$$1 < f1b/f1 < 5 \quad (2)$$

$$2 < f1c/f1 < 10 \quad (3)$$

where
f1 represents a focal length of the first lens group,
f1 b represents a focal length of the $1b$-th lens group, and
f1 c represents a focal length of the $1c$-th lens group.

9. A projector comprising:
an image display device which displays an image;
a light source;
an illumination optical system which directs light from the light source to the image display device; and
a zoom lens system which projects the image displayed on the image display device onto a screen surface on an enlarged scale, wherein the zoom lens system includes, in a first lens group, three lens groups each having a negative optical power, of the three lens groups, a most enlargement-side lens group is a $1a$-th lens group, a lens group located to a reduction side of the $1a$-th lens group is a $1b$-th lens group, and a lens group located to a reduction side of the $1b$-th lens group is a $1c$-th lens group, the $1a$-th lens group remains stationary during focusing and includes at least one positive lens element, the $1b$-th lens group moves toward a reduction side during focusing from infinity to a close distance, and the $1c$-th lens group moves toward the enlargement side during focusing from infinity to a close distance.

10. The projector according to claim 9, wherein conditional formula (1) below is fulfilled:

$$2 < f1a/f1 < 10 \quad (1)$$

where
f1 represents a focal length of the first lens group, and
f1a represents a focal length of the $1a$-th lens group.

11. The projector according to claim 9, wherein conditional formulae (2) and (3) below are fulfilled:

$$1 < f1b/f1 < 5 \quad (2)$$

$$2 < f1c/f1 < 10 \quad (3)$$

where
f1 represents a focal length of the first lens group,
f1 b represents a focal length of the $1b$-th lens group, and
f1 c represents a focal length of the $1c$-th lens group.

12. The projector according to claim 10, wherein conditional formulae (2) and (3) below are fulfilled:

$$1 < f1b/f1 < 5 \quad (2)$$

$$2 < f1c/f1 < 10 \quad (3)$$

where
f1 represents a focal length of the first lens group,
f1 b represents a focal length of the $1b$-th lens group, and
f1 c represents a focal length of the $1c$-th lens group.

* * * * *